United States Patent [19]
Haneda et al.

[11] Patent Number: 5,619,242
[45] Date of Patent: *Apr. 8, 1997

[54] IMAGE FORMING APPARATUS WITH EDGE POINT DETECTOR BASED ON IMAGE DENSITY CHARGE

[75] Inventors: Satoshi Haneda; Masakazu Fukuchi; Tadashi Miwa, all of Hachioji, Japan

[73] Assignee: Konica Corporation, Tokyo, Japan

[ * ] Notice: The term of this patent shall not extend beyond the expiration date of Pat. No. 5,432,611.

[21] Appl. No.: 179,818

[22] Filed: Jan. 11, 1994

Related U.S. Application Data

[63] Continuation of Ser. No. 720,617, Jun. 25, 1991, abandoned.

[30] Foreign Application Priority Data

Jun. 27, 1990 [JP] Japan .................................. 2-169273
Jul. 16, 1990 [JP] Japan .................................. 2-187487

[51] Int. Cl.⁶ .............................. B41J 2/435; H04N 1/409
[52] U.S. Cl. ............................ 347/131; 358/298; 358/300
[58] Field of Search .................................. 395/107, 108, 395/104, 101; 358/298, 458, 300; 347/251, 252, 254, 240, 131, 247, 237, 132

[56] References Cited

U.S. PATENT DOCUMENTS

| | | | |
|---|---|---|---|
| 4,245,260 | 1/1981 | Doelves ................................. | 358/299 |
| 4,253,102 | 2/1981 | Kataoka et al. ........................ | 346/108 |
| 4,347,523 | 8/1982 | Ohara ..................................... | 346/108 |
| 4,393,387 | 7/1983 | Kitamura ................................ | 346/108 |
| 4,395,766 | 7/1983 | Ohnishi et al. ..................... | 358/298 X |
| 4,594,596 | 6/1986 | Takahashi et al. ................. | 346/108 X |
| 4,626,923 | 12/1986 | Yoshida ................................ | 358/298 X |
| 4,679,057 | 7/1987 | Hanada ................................ | 346/108 X |
| 4,788,560 | 11/1988 | Miura ..................................... | 346/108 |
| 4,812,861 | 3/1989 | Sasaki et al. ........................ | 346/108 X |
| 4,831,392 | 5/1989 | Dei ....................................... | 346/154 X |
| 4,847,641 | 7/1989 | Twig ..................................... | 346/154 |
| 4,864,326 | 9/1989 | Kawamura et al. .................... | 346/108 |
| 4,868,684 | 9/1989 | Suzuki ................................ | 358/458 X |
| 4,967,284 | 10/1990 | Yoshida et al. ..................... | 346/108 X |
| 4,978,849 | 12/1990 | Goddard et al. .................... | 346/108 X |
| 5,055,943 | 10/1991 | Kishida ............................... | 358/458 X |
| 5,432,611 | 7/1995 | Haneda et al. ......................... | 358/298 |

Primary Examiner—Benjamin R. Fuller
Assistant Examiner—David Yockey
Attorney, Agent, or Firm—Finnegan, Henderson, Farabow, Garrett & Dunner, L.L.P.

[57] ABSTRACT

An image forming apparatus for forming an image on an image forming body by scanning a plurality of modulated laser beams is disclosed. The apparatus is provided with a generator to generate a plurality of reference signals each with a different phase from other reference signals, a detector for detecting the difference of image density between two adjacent image pixels, combined modulator to generate a modulated laser beam by combining a selected laser beam, a selected reference signal and the image density. The detector classifies each pixel as one of an edge starting pixel, an edge ending pixel, and a non-edge pixel based on the value of image density difference relative to positive and negative threshold values. The selection of the laser beam and the reference signal is based on the image density difference detected by the detector and the class of the pixel.

10 Claims, 14 Drawing Sheets

IMAGE FORMING APPARATUS WITH EDGE POINT DETECTOR BASED ON IMAGE DENSITY CHARGE

This application is a continuation of application Ser. No. 07/720,617, filed Jun. 25, 1991, now abandoned.

BACKGROUND OF THE INVENTION

The present invention relates to an image forming apparatus which reproduces a halftone image by a modulation signal which has been modulated according to a reference signal, and more particularly relates to an image forming apparatus which modulates image density data.

Technique disclosed in U.S. Pat. No. 4,847,641 has been well known as an example of prior art which is applied to a mapped binary image data. In the aforementioned technique, a matching table is utilized to the targeted edge portion so that the image density and image position by a pixel in the targeted edge portion can be redistributed.

However, when an image of high quality is processed, the image data becomes a multi-value image, so that the situation is different from the aforementioned binary image. That is, in the case of a multi-value image, halftone density information exists in a targeted pixel. Furthermore, the amount of information about the matching table becomes large, so that the cost of the apparatus is raised and it is difficult to process image data at a high speed.

SUMMARY OF THE INVENTION

It is a primary object of the present invention to provide an image forming apparatus which can process an image data of high quality effectively in order to obtain an image of high quality.

In order to accomplish the aforementioned object, the present invention is to provide an image forming apparatus which can form an image on its image forming body by oscillating a plurality of lasers according to a modulated signal that has been made by modulating an image data with a reference signal, and which comprises: a detection circuit to detect the image distribution density of an adjacent image; and a combined modulation means which modulates the image density by selectively combining a reference signal, the phase of which is different from the image density data, with a laser in accordance with the results of the aforementioned detection, wherein the aforementioned combined modulation means is provided with the first selector circuit which selectively outputs the aforementioned image density data, a plurality of modulation circuit which modulates the image density data with the aforementioned reference signal of which phase is different, and the second selection circuit which selectively turns on only one of the aforementioned plurality of lasers.

Further, the present invention is to provide an image forming apparatus in which a semi-conductor laser array, the intensity of light emitted by the semi-conductor array is modulated by an image density data, is oscillated in order to form an image on an image forming body, and which is characterized in that: the number of light emitting elements of the semi-conductor laser array corresponds to the number of scanning lines in a pixel in the primary scanning direction.

Further, the image forming apparatus of the present invention is characterized in that: the interval of scanning which has been conducted by the light emitting elements on the image forming body, is set smaller than the value obtained when the width of a pixel is divided by the number of scanning lines.

Further, in the present invention, the aforementioned image density distribution circuit can detect the edges in the primary and secondary scanning directions.

BRIEF DESCRIPTION OF THE DRAWINGS

FIG. 14 is a block diagram showing an embodiment of the image processing circuit adopted in the fifth embodiment;

DETAILED DESCRIPTION OF THE PREFERRED EMBODIMENTS

The structure of the image forming apparatus 400 of this embodiment will be explained as follows.

Figure 7:
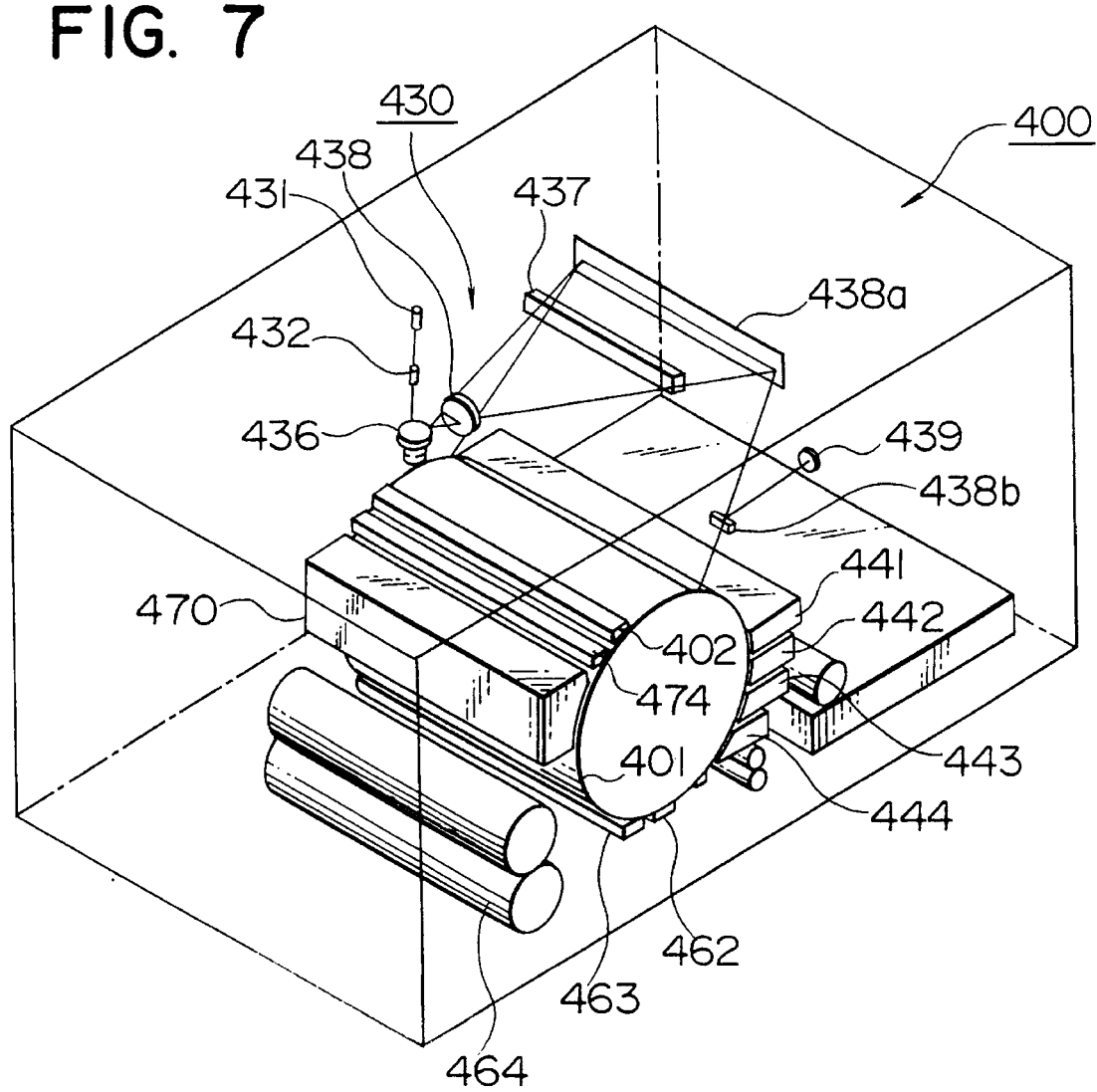
FIG. 7 is a perspective view showing the outline of the structure of the image forming apparatus of the embodiment.

FIG. 7 is a perspective view showing the outline of the structure of the image forming apparatus of this embodiment.

A color image can be obtained by the color image forming apparatus 400 as follows:

After a photoreceptor has been uniformly charged, an analog image density signal which can be obtained by D/A-converting a digital image density signal sent from a computer or a scanner, is compared with a reference signal so that the analog image density signal is binarized.

Otherwise, a color image can be obtained as follows:

A dot-shaped electrostatic latent image is formed by a spot light which has been pulse-modulated or intensity-modulated in accordance with a modulation signal obtained by differential amplification, and the electrostatic latent image is reversely developed by toner so that a dot-shaped toner image is formed. The aforementioned charging, exposing and developing processes are repeatedly conducted so that a color toner image can be formed on the surface of a photoreceptor 1, and then the obtained color toner image is transferred, separated and fixed.

The image forming apparatus 400 is composed of, a drum-shaped photoreceptor 401 (hereinafter, referred to as a photoreceptor) which is rotated in the direction of an arrow, a scorotron charger 402 which gives a uniform electric charge on the aforementioned photoreceptor 401, an optical scanning system 430, developing units 441–444 which are loaded with yellow, magenta, cyan and black toners, a pre-transfer charger 461, a scorotron transfer unit 462, a separator 463, a fixing roller 464, a cleaning unit 470, and a discharger 474.

Figure 6:
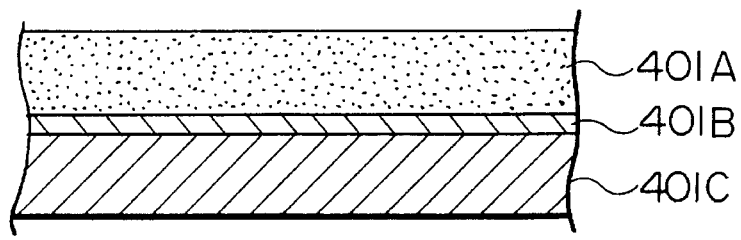
FIG. 6 is a sectional view showing a specific example of the structure of a high γ photoreceptor.

FIG. 6 is a sectional view showing an example of a specific structure of a high γ photoreceptor.

The structure of the high γ photoreceptor of this embodiment will be explained as follows.

As illustrated in FIG. 6, the photoreceptor 401 is composed of a conductive support 401A, an intermediate layer 401B, and a photosensitive layer 401C. The thickness of the photosensitive layer 401C is 5–100 μm, and preferably 10–50 μm. The photoreceptor 401 is made of an aluminum drum-shaped conductive support 401A. On the aforementioned support 401A is formed the intermediate layer 401B of 0.1 μm in thickness, which is made from ethylene-vinyl acetate, and on the intermediate layer 401B is provided the photosensitive layer 401C, the thickness of which is 35 μm.

A drum of 150 mm in diameter which is made from aluminum, steel or copper is used for the conductive support 401A. A belt-shaped conductive support is also used which is made in such a manner that a metallic layer is vapor-deposited or laminated on a paper or a plastic film. A metallic belt made from nickel by means of electroforming may be also used. It is preferable that the intermediate layer 401B can endure a high potential charging of ±500–±2000V as a photoreceptor, and it is further preferable that the intermediate layer 401B is provided with a Hall mobility so that the flow of electrons from the conductive support 1C can be prevented when it has been charged positive, and so that an excellent light decay characteristic can be obtained due to the avalanche effect. Therefore, it is preferable that a positive charging type of electric charge conveyance material which has been disclosed in Japanese Patent Application 188975/1986 by the inventors, is added to the intermediate layer 401B by not more than 10 weight percent.

The following resins which are commonly used in a light sensitive layer for electrophotography use, are used for the intermediate layer 401B.

(1) Vinyl polymer such as polyvinyl alcohol (poval), polyvinyl methyl ether, polyvinyl ethyl ether, and the like (2) Vinyl polymer containing nitrogen such as polyvinyl amine, poly-N-vinyl imidazole, polyvinyl pyridine, polyvinyl pyrrolidone-vinyl acetate copolymer, and the like (3) Polyether polymer such as polyethylene oxide, polyethylene glycol, polypropylene glycol, and the like (4) Acrylic acid polymer such as polyacrylic acid and its polymer, polyacrylic amide, poly-β-hydroxy ethyacrylate, and the like (5) Metaacrylic acid polymer such as polymetaacrylic acid and its salt, polymetaacrylic amide, polyhydroxy propylmetaacrylate, and the like (6) Ether cellulose polymer such as methyl cellulose, ethyl cellulose, carboxymethyl cellulose, hydroxymethyl cellulose, hydroxypropylmethyl cellulose, and the like (7) Polyethylene imine polymers such as polyethylene imine and the like (8) Polyamino acid such as polyalanine, poly?????, poly-L-glutamic acid, poly-(hydroxyethyl)-L-glutamine, poly-δ-carboxymethyl-L-cysteine, polyproline, lysine-thylosin copolymer, glutamic acid-lysin-alanine copolymer, silk-fibroin, casein, and the like (9) Starch and its derivative such as starch acetate, hydroxyne ethyl starch, starch acetate, hydroxyethyl starch, amine starch, phosphate starch, and the like

(10) Polymer soluble in a mixed solvent of water and alcohol such as soluble nylon of polyamide, methoxymethyl nylon (8 type nylon), and the like The photosensitive layer 401C is formed by coating a coating agent on an intermediate layer and after that the coated layer is dried and heat-treated if necessary, wherein the coating agent is prepared as follows: basically, electric charge conveyance material is not added into the photosensitive layer 401C; phthalocyanine fine particles of 0.1–1 μm in diameter composed of a photoconductive pigment, an antioxidant and a binder resin are mixed and dispersed in a solvent.

In the case where a photoconductive material and electric charge conveyance material are jointly used, a photosensitive layer is composed as follows: a photoconductive material composed of a photoconductive pigment and a small amount of electric charge conveyance material, the amount of which is not more than ⅕ of the aforementioned photoconductive pigment, or preferably ¹⁄₁₀₀₀–¹⁄₁₀ (weight percent) of the pigment, and an antioxidant are dispersed in a binder resin. When a high γ photoreceptor described above is utilized, a sharp latent image can be formed although the diameter of a beam is spread, so that a recording of high resolution can be effectively conducted.

In this embodiment, color toner images are superimposed on a photoreceptor. Accordingly, a photoreceptor, the spectral sensitivity of which is on the infrared side, and a semiconductor laser of infrared light are used so that the beam sent from the optical scanning system can not shade the color toner image.

The light decay characteristic of the high γ photoreceptor of the present invention will be explained as follows.

Figure 5:
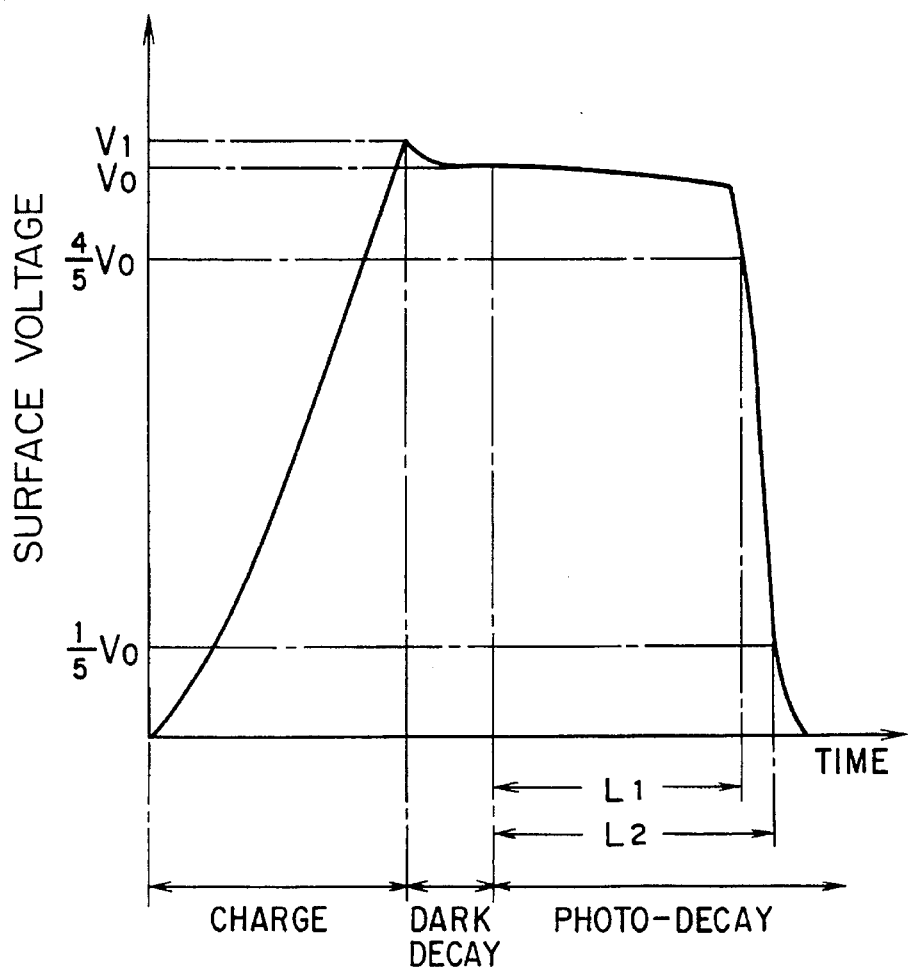
FIG. 5 is a graph showing the characteristic of a high γ photoreceptor.

FIG. 5 is a graph showing the outline of a high γ photoreceptor. In FIG. 5, $V_1$ is a charging potential (V), $V_0$ is an initial potential (V) before exposure, $L_1$ is the amount (μJ/cm$^2$) of light of the illuminated laser beam which is required to reduce initial potential $V_0$ to ⅘, and $L_2$ is the amount (μJ/cm$^2$) of light of the illuminated laser beam which is required to reduce initial potential $V_0$ to ⅕.

A preferable range of $L_2/L_1$ is $1.0 < L_2/L_1 \leq 1.5$.

In this embodiment, $V_1 = 1000(V)$, $V_0 = 950(V)$, and $L_2/L_1 = 1.2$. The photoreceptor potential of the exposure section is 10V.

Assume that the light sensitivity is $E_{1/2}$ at the position corresponding to the middle period of exposure in which the initial potential ($V_0$) is decayed to ½, and that the light sensitivity is $E_{9/10}$ at the position corresponding to the initial period of exposure in which the initial potential ($V_0$) is decayed to 9/10, then a photoconductive semiconductor satisfying the following inequality is selected.

$$(E_{1/2})/(E_{9/10}) \geq 2$$

Preferably $$(E_{1/2})/(E_{9/10}) \geq 5$$

In this case, light sensitivity is defined as the absolute value of potential drop with regard to a minute amount of exposure.

In the light decay curve of the photoreceptor 401, the absolute value of the differential coefficient of the potential characteristic is decayed a little when the amount of light is small, and decayed sharply as the amount of light is increased. Specifically, in the initial period of exposure of the light decay curve as shown in FIG. 5, the sensitivity characteristic is bad for a certain period of time $L_1$. However, in the middle period of exposure of $L_1$ to $L_2$, the light sensitivity is highly increased so that the light decay curve goes downward almost linearly, in other words, the photoreceptor shows a super-high γ characteristic. It can be considered that the photoreceptor 1 acquires a high γ characteristic using an avalanche phenomenon under a high charging potential of +500–+200V. It can be considered as follows. That is, the carrier generated on the surface of the photoconductive pigment in the initial stage of exposure, is effectively trapped by an interface layer between the pigment and coated resin, so that light decay is positively restricted. As a result, a very sharp avalanche phenomenon is caused in the middle stage of exposure.

Next, the image formation of the present invention will be explained as follows in the first embodiment, a plurality of reference waves among which there is a difference of phase, are used for the reference wave with which the image density data is combined. According to the result sent from an edge detection circuit in which the image density data has been processed, the image density data and a specific reference wave are selectively combined in order to obtain a modulated image signal by which image formation is conducted. A high γ photoreceptor is effective in order to form a latent image in response to a reference wave in an accurate way.

Figure 1:
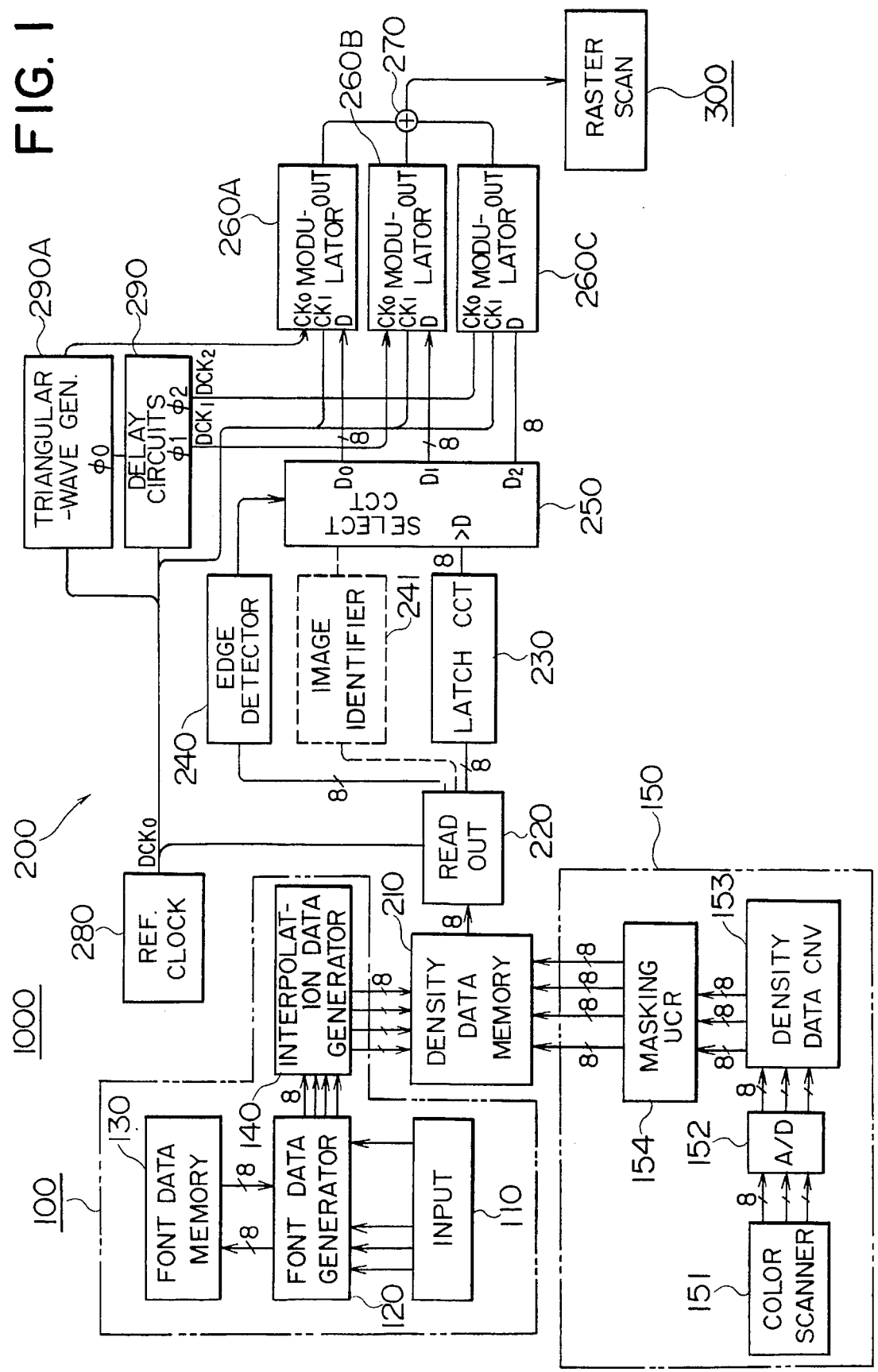
FIG. 1 is a block diagram of the image processing circuit of the first embodiment which is adopted to the image forming apparatus of the present invention.
Figure 2:
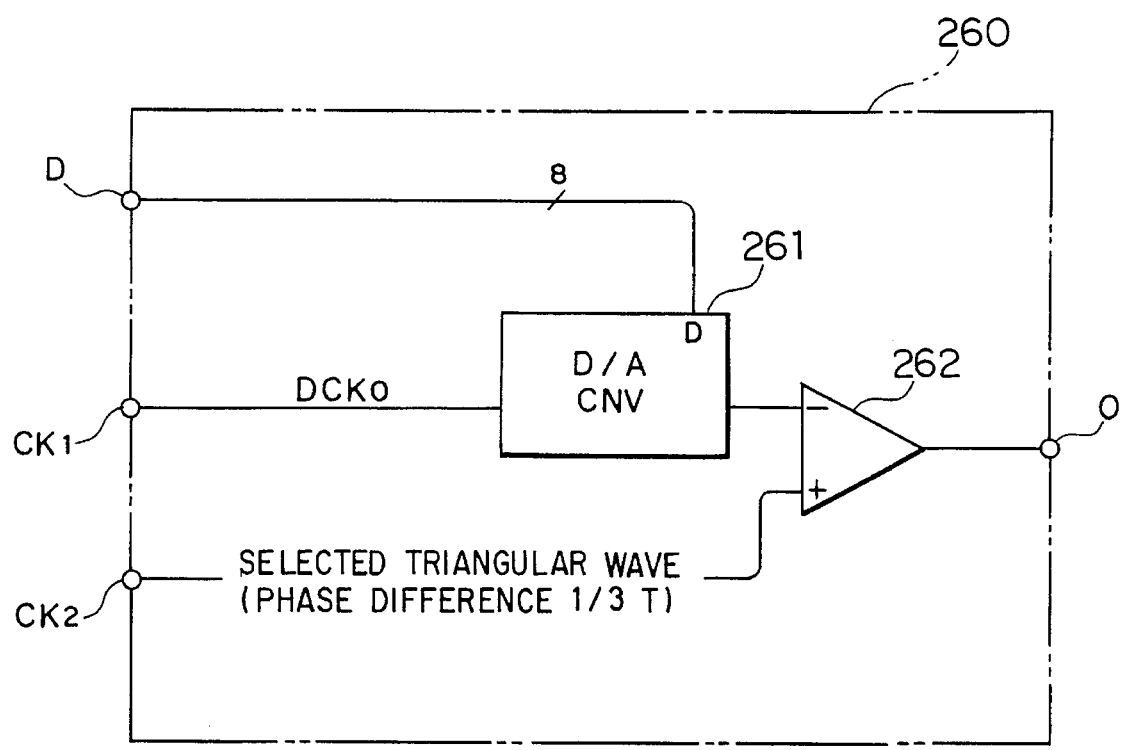
FIG. 2 is a block diagram showing a modulation circuit of the first embodiment.

FIG. 1 is a block diagram showing an example of the image processing circuit adopted for the image forming apparatus of the first embodiment of the present invention. FIG. 2 is a block diagram showing the modulation circuit of this embodiment.

An image processing circuit 1000 of this embodiment is a circuit composing a drive circuit of an optical scanning system. The image processing circuit 100 is composed of an image data processing circuit 100, a modulation signal generating circuit 200, and a raster scanning circuit 300.

The image processing circuit 100 is a circuit to interpolate the edge portion of font data and output the obtained data. The image processing circuit 100 is composed of an input circuit 110, font data generating circuit 120, font data storing circuit 130, and interpolation data generating circuit 140. A character code signal, size code signal, position code signal, and color code signal are sent from the input circuit 110 to the font data generating circuit 120. The font data generating circuit 120 selects an address signal from 4 kinds of input signals and sends the selected signal to the font data storing circuit 130. The font data storing circuit 130 sends font data corresponding to the address signal to the font data generating circuit 120. The font data generating circuit 120 sends the font data to the interpolation data generating circuit 140. The interpolation data generating circuit 140 interpolates a zig-zag and jump of the image density data which are caused on the edge of font data using an intermediate density, and sends the interpolated data to the image density data storing circuit 210 composed of a frame memory. Concerning the color to be generated, the corresponding data is converted to the density data of Y, M, C, and BK in accordance with a color code. In the way described above, the font is bit-map-developed in each frame memory under the condition that the shape is the same and the density ratio of each color is different.

The modulation signal generating circuit 200 reads out the image density data of the unit of one scanning line from the image density data storing circuit 210. The image density data corresponding to the edge is detected from the image density data of the unit of one scanning line by the edge detection circuit 240. A modulation signal is made in the modulation circuits 260A–260C by the reference wave, the phase of which is different corresponding to the direction of the edge. The obtained modulation signal is synthesized in the synthesizing circuit 270 synchronously with reference clock $DCK_0$, and the modulation signal of the unit of one scanning line is sent to the raster scanning circuit 300.

The modulation signal generating circuit 200 is composed of the image density data storing circuit 210, the reading out circuit 220, the latch circuit 230, the edge detection circuit 240, the modulation circuits 2610A–260C, the synthesizing circuit 270, the reference clock generating circuit 280, and the delay circuits 290.

The image density data storing circuit 210 is usually a page memory (which is referred to as a page memory 210, hereinafter). That is, the image density data storing circuit 210 is a RAM which stores the data by the unit of a page, and at least has a capacity of storing a page of multi-value image density data. When the apparatus is used for a color printer, the apparatus must be provided with a storage capacity enough to store the image density signal corresponding to a plurality of colors, for example, yellow, magenta, cyan and black.

The reading out circuit 220 reads out the image density data of the unit of one scanning line synchronously with reference clock $DCK_0$ using the index signal for a trigger, and sends the data to the latch circuit 230 and edge detection circuit 240.

In the edge detection circuit 240, the finite difference of the image density data of the unit of one scanning line inputted continuously and the density change between each pixel in that scanning line is calculated as a density change value between each pixel. The density change value may be zero or have a plus or minus sign as shown in FIG. 3(b). The calculation is performed on each pixel as a target pixel with reference to a neighboring pixel and the obtained finite difference value is sent to the selection circuit 250. When a predetermined value is expressed by α and the finite difference value is not less than α, "1" is outputted, and when the finite difference value is not more than −α, "−1" is outputted. In the way described above, the sign of positive or negative is attached according to the direction of the edge. The positive sign stands for the left side edge with regard to the scanning line, and the negative sign stands for the right side edge with regard to the scanning line. In the case of the portion except for the edge, the finite difference value is in the range of −α and +α. In this case, the finite difference value is defined as "0".

The latch circuit 230 latches the image density data for the period in which the edge detection circuit 240 conducts the aforementioned processing.

The selection circuit 250 outputs the image density data from one of the output terminals $D_0$–$D_2$ in accordance with the finite difference value. Specifically, when the finite difference value is "0", the image density data is sent from output terminal $D_0$, and the density data of white background is sent out from output terminals $D_1$ and $D_2$. When the finite difference value is "−1" the image density data is sent out from output terminal $D_2$, and output terminals $D_0$, $D_1$ send out the density data corresponding to white background. When the finite difference value is "+1", the image density data is sent out from output terminal $D_1$, and output terminals $D_0$, $D_2$ send out the density data corresponding to white background. The most simple example has been shown above. It is preferable that the above-described judgment is conducted on the basis of two dimensional information. In this case, judgment is preferably conducted referring the finite difference value to a ROM table.

The reference clock generating circuit 280 is a pulse generating circuit in which a pulse signal, the repetition period of which is the same as the pixel clock, is generated, wherein this clock is referred to as reference clock $DCK_0$.

Numeral 290A is a triangular wave generating circuit which forms triangular waves of the pixel clock according to reference clock $DCK_0$. The delay circuits 290 is a circuit which generates a plurality of pixel clocks $DCK_1$, $DCK_2$, the phase difference of which is ⅓ period with regard to reference clock $DCK_0$. In this case, pixel clock $DCK_1$, the phase of which is delayed by ⅓ period with regard to reference clock $DCK_0$, and pixel clock $DCK_2$, the phase of which is advanced by ⅓ period with regard to reference clock $DCK_0$, are generated. In the way described above, a triangular wave, the phase of which is delayed by ⅓ phase with regard to the triangular wave of the reference clock, is outputted.

As illustrated in FIG. 2, the modulation circuits 260A–260C have the same circuit structure. The modulation circuits are provided with the D/A-conversion circuit 261, the comparator 262, and the triangular wave input section of the aforementioned triangular wave or the triangular wave, the phase of which is shifted by ⅓ period. The image density data sent from the selection circuit 250 is D/A-converted by the D/A-conversion circuit 261 synchronously with reference clock $DCK_0$, and the modulation circuits 260A–260C obtain the pulse width modulation signal using the aforementioned triangular wave for a reference signal. In the manner described above, the image density data corresponding to the edge is edge-processed, wherein the image density data continues in the form of a scanning line.

The synthesizing circuit 270 synthesizes the modulation signals sent from the aforementioned modulation circuits 260A–260C.

The raster circuit 300 is provided with the LD drive circuit, index detection circuit, and polygonal mirror driver, which are not shown in FIG. 1.

The LD drive circuit oscillates the semi-conductor laser 431 (FIG. 7) in accordance with the modulation signal sent from the synthesizing circuit 270. A signal corresponding to the amount of the beam sent from the semi-conductor laser 431 is fed back to an LD drive circuit so that the amount of laser beam can be constant.

The index detection circuit detects the position of the polygonal mirror 436 face which is rotated at a predetermined speed by the index signal sent from the index sensor 439, and optical scanning is conducted by the raster scanning system in accordance with the modulated digital image density signal which will be described later, wherein the optical scanning is conducted according to the period of the primary scanning. The frequency of scanning is 2204.72 Hz, the effective printing width is not less than 297 mm, and the effective exposure width is not less than 306 mm.

The polygonal mirror driver rotates the polygonal mirror 36 by a DC motor at a revolution speed of 16535.4rpm.

In the case described above, the image processing circuit 1000 is applied to a laser printer. However, the usage of the image processing circuit 1000 is not limited to a laser printer, but it can be applied to other image forming apparatuses such as a copying machine when the image data processing circuit 100 is replaced with an image data processing circuit 150 comprising a color scanner 151, A/D-conversion circuit 152, density conversion circuit 153, masking VCR circuit 154 and the like so that the image density data can be inputted from the scanner and the image can be processed.

Figure 4:
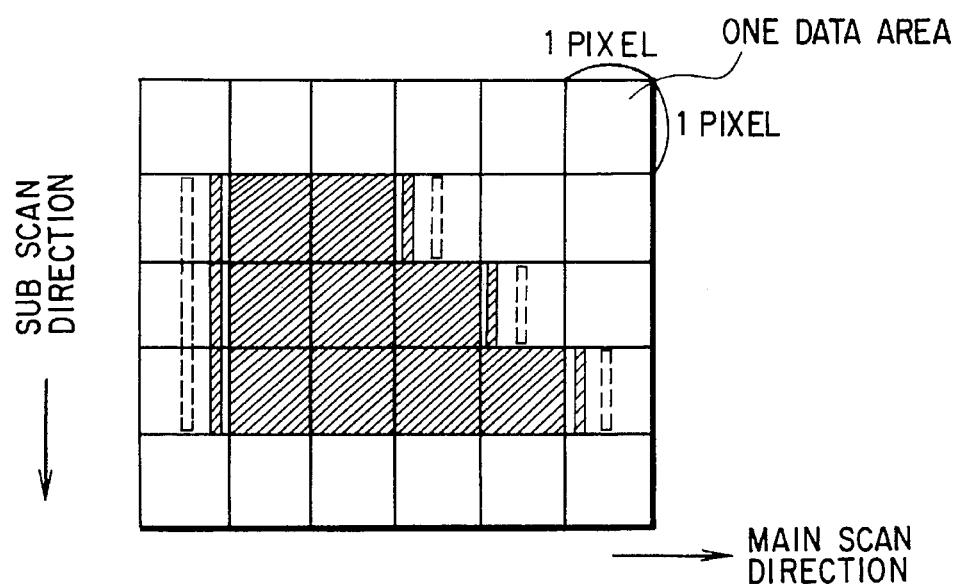
FIG. 4 is a schematic illustration of image formation which has been conducted according to the modulation signal sent from the image processing circuit of the first embodiment.

FIG. 4 is a view showing a model in which a latent image is formed according to the modulation signal sent from the image processing apparatus of the first embodiment.

The image forming apparatus 400 of this embodiment expresses the gradation by changing the dot area. When the edge of high image density overlaps a pixel to be read out in the case of the image signal made by a computer or read in by a scanner, the signal of the pixel at the overlapping portion is like the intermediate density of a uniform image. When a selection circuit having edge detecting function is not adopted but the same reference wave is utilized, the recording at the edge is isolated in the middle portion of a pixel as illustrated by a dotted line in FIG. 4. When the modulation signal generating circuit 200 is utilized, the signal is transferred to the edge in the primary direction, so that a dot of the edge can be recorded. When an electrostatic latent image is formed in the manner described above, the resolution of the edge can be improved.

Next, the operation of the modulation signal generating circuit 200 will be explained as follows.

Figure 3:
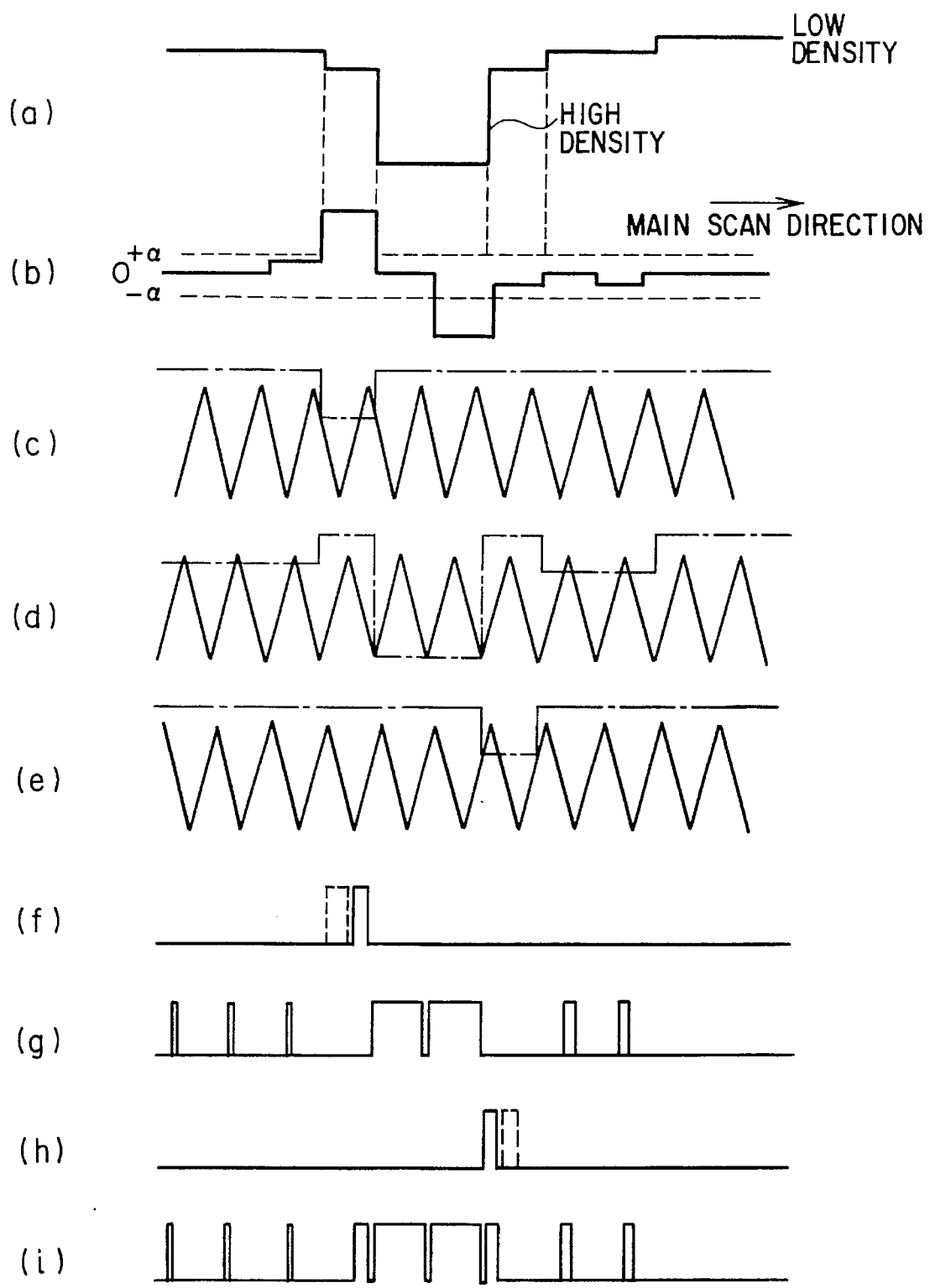
FIG. 3 is a time chart which shows signals of the modulation signal generation circuit of the first embodiment.

In FIG. 3, (a)–(i) are time charts showing the signal of each section of the modulation signal generating circuit of the first embodiment.

In FIG. 3, (a) shows a portion of one scanning line of image density data which is read out from the page memory 210 according to reference clock $DCK_0$ using the index signal as a trigger. This one scanning line of image density data is simultaneously sent from the reading-out circuit 220 to the edge detection circuit 240 and latch circuit 230. The higher the level of signal is, the lower the density is, and the lower the level of signal is, the higher the density is.

In FIG. 3, (b) shows the output from the edge detection circuit 240 which outputs the change of the level of continuous image density data, in other words, the differential value of the level of continuous image density data. In this way, the tilt of the image density in one scanning line can be detected. In the case where the differential value is not less than absolute value α, it can be judged that there is a tilt. Further, the direction of the edge of the image density is detected. That is, when the outputted value is positive, it shows that the edge is located on the left of the primary scanning direction, and the outputted value is negative, it shows that the edge is located on the right of the primary scanning direction. In the case where the outputted value is "0", it shows that the image density data of the same level is connected with the edge. This output signal is sent to the selection circuit 250 according to the reference clock $DCK_0$.

On the other hand, the latch circuit 230 latches the signal for a period of time corresponding to the processing speed of the edge detection circuit 240. The selection circuit 250 sends out the density data from different output terminal according to the output of the edge detection circuit 240.

In FIG. 3, (c) shows a modulating operation in the modulation circuit 260A. Only when the output of the detection circuit 240 is positive, the image density data is inputted into the modulation circuit 260A, and when the output of the edge detection circuit 240 is not positive, the image density data of white background is inputted. The triangular wave outputted at this time is made from clock $DCK_2$, the phase of which is advanced by $\frac{1}{3}$ period with regard to reference clock $DCK_0$, and the repetition period of which is the same. In the manner described above, as shown in FIG. 3(f), the output signal of the modulation circuit 260A is a modulation signal, the phase of which is advanced by $\frac{1}{3}$ period compared with the modulation signal which has been pulse-width-modulated by the triangular wave according to reference clock $DCK_0$.

In FIG. 3, (d) shows a modulating operation in the modulation circuit 260B. The image density data in the period when the selection signal from the edge detection circuit 240 is "0", is the image density data of white background in the case where the output is not "0" and the modulation signal shown in (g) is outputted.

In FIG. 3, (e) shows a modulating operation in the modulation circuit 260C. For the period in which the output of the edge detection circuit 240 is negative, processing is conducted on the image density data which is previous by one pixel. That is, when the output of the edge detection circuit 240 is "−1", the image density data is inputted, and when the output is not "−1", the image density data of white background is inputted. In this case, the phase of the triangular wave is delayed by $\frac{1}{3}$ period with regard to reference clock $DCK_0$. In the manner described above, as illustrated in FIG. 3 (h), the phase of the modulation signal outputted from the modulation circuit 260C is delayed by $\frac{1}{3}$ period as compared with the modulation signal which has been pulse-width-modulated by the triangular wave according to reference clock $DCK_0$.

In FIG. 3, (i) shows a modulation signal outputted from the synthesizing circuit 270. As described above, in the case of the modulation signal generating circuit 200 of this embodiment, an image is formed in such a manner that it is transferred on the edge side with regard to the primary scanning direction. When an electrostatic latent image is formed in the manner described above, the resolution of the edge can be improved.

The image forming process conducted in the image forming apparatus 400 will be explained as follows.

First, the photoreceptor 401 is uniformly charged by the scorotron charger 402. An electrostatic latent image corresponding to yellow is formed on the drum-shaped photoreceptor 401 by the laser beam which has been optically modulated by yellow, data (8 bits of digital density data) stored in the image density data storing circuit 210. The aforementioned electrostatic latent image corresponding to yellow is developed by the first developing unit 441, and the first dot-shaped toner image (a yellow toner image), which is very sharp, is formed on the photoreceptor 401. While the first toner image formed in the manner described above is not transferred onto recording paper P, the photoreceptor 401 is charged by the scorotron charger 402 again.

Next, the laser beam is optically modulated by magenta data (8 bits of digital density data), and the photoreceptor 401 is exposed with the modulated laser beam so that an electrostatic latent image is formed. This electrostatic latent image is developed by the second developing unit 442 so that the second toner image (a magenta toner image) is formed. In the same way, the third toner image (a cyan toner image) is sequentially developed by the third developing unit 443, and a three color toner image is formed on the photoreceptor 401. Finally, the fourth toner image (a black toner image) is formed, and a four color toner image is formed on the photoreceptor 401.

According to the image forming apparatus 400 of this embodiment, the photoreceptor has an excellent high $\gamma$ characteristic. According to the aforementioned excellent high $\gamma$ characteristic, even when a plurality of toner images are formed on the photoreceptor by conducting a plurality of charging and developing processes, a latent image can be stably formed. That is, even when a toner image is illuminated with a beam according to a digital signal, a very sharp dot-shaped electrostatic latent image without a fringe is formed. As a result, a very sharp toner image can be obtained.

After the photoreceptor 401 has been charged by the charger 461 (this process may be omitted), this 4 color toner image is transferred by the action of the transfer unit 462 onto recording paper P supplied by a paper feeding unit.

Recording paper P on which the toner image has been transferred, is separated from the photoreceptor 401 by the separation electrode 463. Then, recording paper P is conveyed by a guide and conveyance belt to the fixing unit 464 so that the transferred image is fixed. After that, recording paper P is discharged onto a discharge tray.

Figure 8:
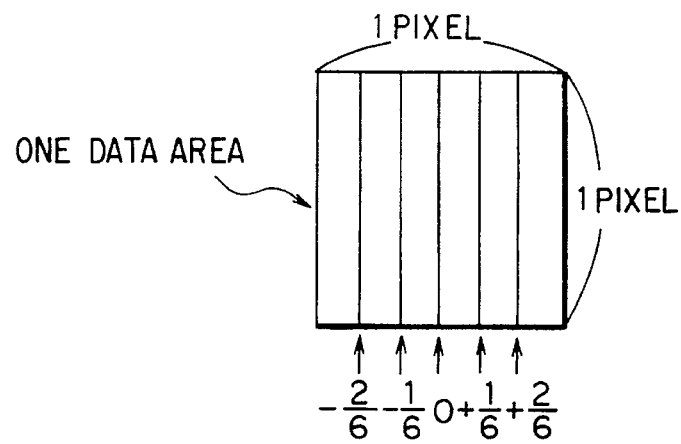
FIG. 8 is a view which shows the center of recording at each phase in a pixel in the first embodiment.

In this embodiment, 3 reference waves, the phases of which are respectively shifted by $\frac{1}{3}$ period $(0, \pm\frac{1}{3})$, are utilized. Reference waves of other phases may be used. For example, the phases of $(0, \pm\frac{1}{4})$ or phases of $(0, \pm\frac{1}{6})$ may be used. It is preferable that not less than 3 reference waves are selectively utilized according to the situation such as the image density or edge detection output. For example, the reference wave, the phase of which differs by $(0, \pm\frac{1}{6}, \pm\frac{2}{6})$ may be used. FIG. 8 is a view showing the center of recording at each phase in a pixel.

In FIG. 8, arrow marks attached by the signs of $\pm\frac{1}{6}$ and $\pm\frac{2}{6}$ indicate the position from which recording operation starts. In the case where the reference wave shown in FIG. 3 is utilized, the recording area spreads symmetrically with these positions. In this case, the recording pixel density is considered in the following way. Therefore, even when a recording pixel is judged to be the edge by the edge detection circuit, the reference wave to be combined with the image density data is preferably restricted by a certain condition for the purpose of confining the recording area within the image pixel. In this case, a desirable image without any density jump can be obtained by selecting the reference wave as follows: the phase of the reference wave is $\pm\frac{2}{6}$ when the pixel of the image density data occupies $\frac{1}{3}$ of the area; the phase of the reference wave is $\pm\frac{1}{6}$ when the pixel of the image density data occupies $\frac{1}{3}$–$\frac{2}{3}$ of the area; and even when the edge is detected, the pixel of the image image density data occupies not less than $\frac{2}{3}$ of the area, the phase of the reference wave is 0. In the case of the reference wave of $(0, \pm\frac{1}{3})$ which has been shown in this embodiment, when the image density data occupies not less than $\frac{1}{3}$ in the pixel, the reference wave of 0 phase is preferably selected. When the reference wave, the phase of which is different according to the image density data, is selected, a sharp image which harmonizes with the adjacent image density can be obtained.

The second embodiment of the present invention will be explained as follows. In the second embodiment, image formation is conducted as follows: a plurality of reference waves composed of a triangular wave and a tooth wave is utilized for the reference wave to be combined with the image density data; the image density data and a specific reference wave are selectively combined according to the result of detection conducted by the edge detection circuit; and image formation is conducted by the modulated image signal obtained in the manner described above.

Figure 10:
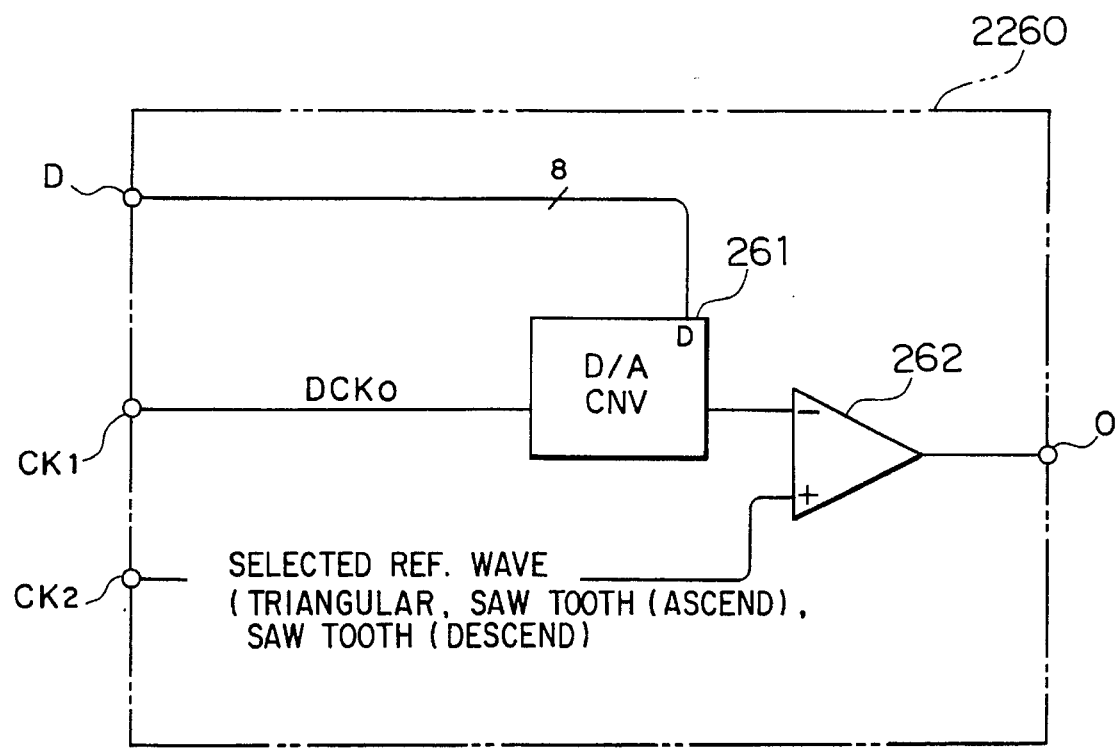
FIG. 10 is a block diagram which shows the modulation circuit of the second embodiment.
Figure 9:
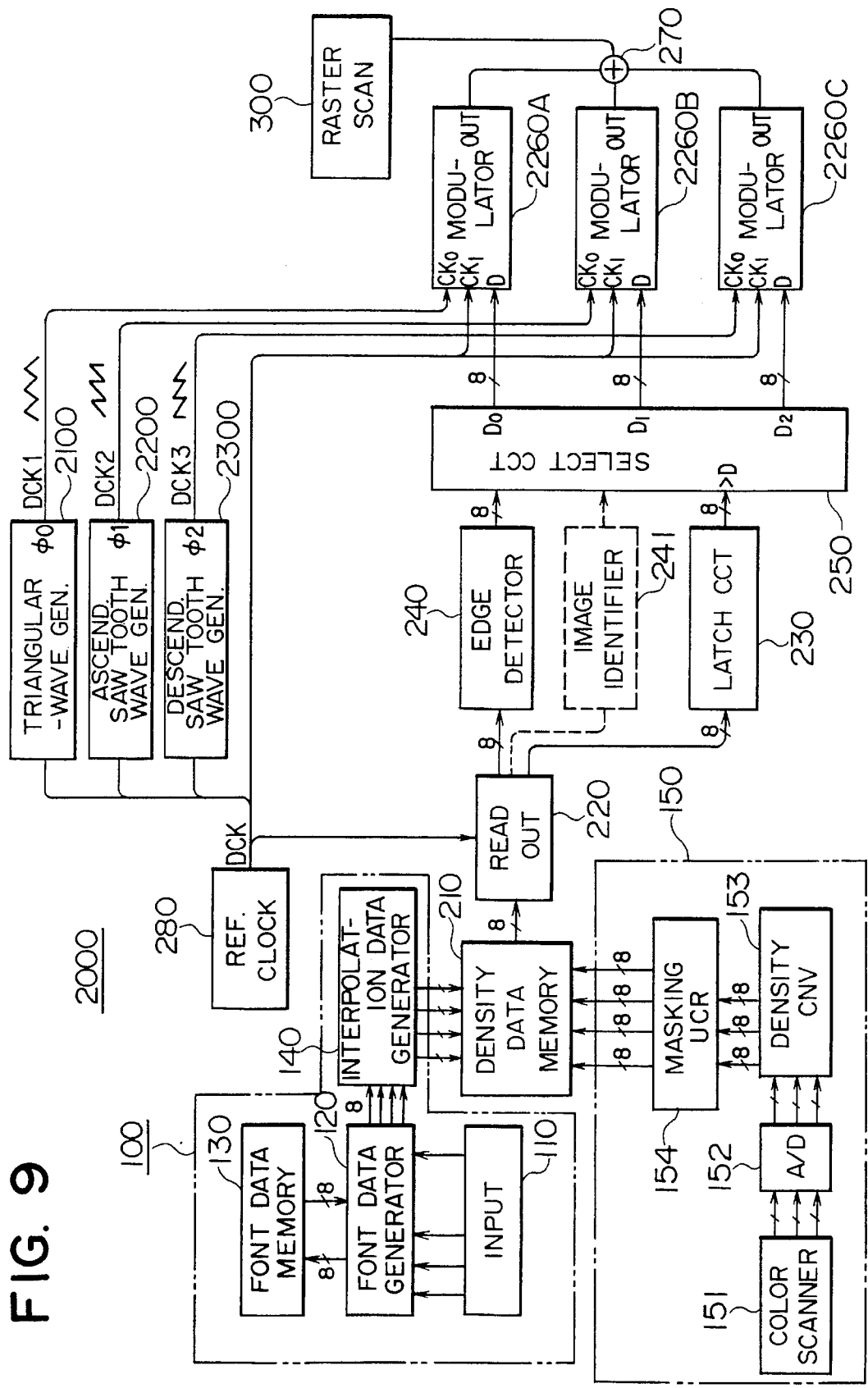
FIG. 9 is a block diagram of the image processing circuit of the second embodiment.

FIG. 9 is a block diagram showing an example of the image processing circuit adopted in the image forming apparatus of the second embodiment of the present invention. FIG. 10 is a block diagram showing the modulation circuit of the embodiment. Like reference characters designate like or corresponding parts throughout FIG. 1 and FIG. 10, and explanations are omitted here.

The image processing circuit 2000 of this embodiment generates 3 reference waves of the same pixel clock and the same phase according to the pulse signal sent from the reference clock generating circuit 280. One of the 3 reference waves is a triangular reference wave outputted by the triangular wave generating circuit 2100, and other 2 are a rise tooth reference wave outputted by the rise tooth reference wave generating circuit 2200 and a fall tooth reference wave. The tilt of the image density in a scanning line is detected by the differential value of the output of the edge detection circuit 240. In the same manner as described in the first example, the detection is conducted in such a manner that: when the output is positive, the edge is located on the left with regard to the primary scanning direction; and when the output is negative, the edge is located on the right with regard to the primary scanning direction. When the output is "0", it shows that the image density data of the same level continues. The selection circuit 250 sends the density data from different output terminals $D_0$, $D_1$, $D_2$ in accordance with the output of the edge detection circuit 240.

Figure 11:
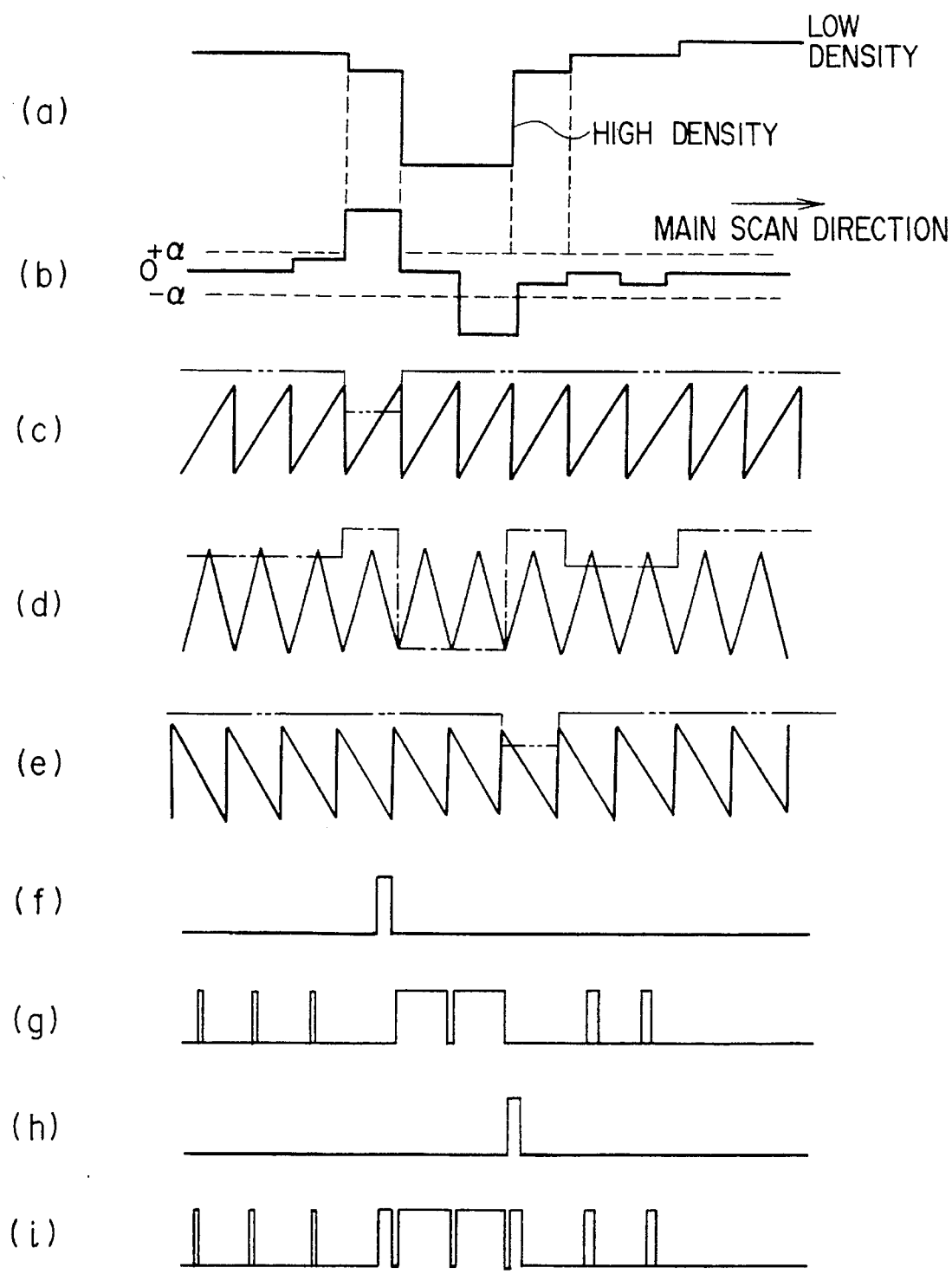
FIG. 11 is a time chart which shows signals of the modulation signal generating circuit of the second embodiment.

FIG. 10 shows the modulation circuit 2260. The image density data in the period when the output of the edge detection circuit 240 is "0", is inputted to the modulation circuit 2260A from the selection circuit 250, and the image density data of white background is inputted to the modulation circuit 2260A from the selection circuit 250 when the output of the edge detection circuit is not "0". The triangular wave of the pixel clock is inputted into the comparator 262 from the triangular wave generating circuit 2100 as a reference wave. FIG. 11 shows time charts showing the signal of the modulation signal generating circuit. FIG. 11(d) shows a modulating operation of the modulation circuit 2260A, and FIG. 11(g) shows a modulation signal to be outputted.

Only when the output of the edge detection circuit 240 is positive, the image density data is inputted into the modulation circuit 2260B from the selection circuit 250, and when the output of the edge detection circuit 240 is not positive, the image density data of white background is inputted. The rise tooth wave of the pixel clock is inputted as a reference wave into the comparator 262 of the modulation circuit 2260B from the rise tooth wave generating circuit 2200. FIG. 11(c) shows a modulating operation of the modulation circuit 2260B, and FIG. 11(f) shows a modulation signal to be outputted.

Only when the output of the edge detection circuit 240 is negative, the image density data is inputted from the selection circuit 250 into the modulation circuit 2260C. When the output of the edge detection circuit 240 is not negative, the image density data of white background is inputted. The fall tooth reference wave is inputted from the fall tooth wave generating circuit 2300 into the comparator 262 of the modulation circuit 2260C. FIG. 11(e) shows a modulating operation of the modulation circuit 2260C, and FIG. 11 (h) shows a modulation signal to be outputted.

The modulation signals outputted from the modulation signals 2260A, 2260B, 2260C are synthesized by the synthesizing circuit 270 and outputted. FIG. 11(i) shows a modulation signal which is synthesized and outputted. In FIG. 11(i), the modulation signal is shown by one scanning line. In the case where a latent image is formed by the modulation signal sent from the image processing apparatus of the second embodiment, a latent image is formed in the manner shown in FIG. 4 of the first embodiment. As a result of various experiments made by the inventors, the following were found out: an image of high quality can be obtained in the case of the second embodiment as compared with the first embodiment; and the second embodiment is more advantageous than the first embodiment, because there is no limit of image density data when edge detection is conducted.

Further, it is possible to improve the selection of the reference wave. When the information according to the edge detection circuit 240 is utilized, the reproduction of characters can be improved. However, the edge tends to be emphasized in the reproduction of a half-tone image. Therefore, the reference wave is preferably selected by combining the information of image judgment a and edge detection, which is shown by the image judging circuit 241 illustrated by a broken line in FIG. 1 and FIG. 9.

The image judging circuit 241 judges whether the image is a character, half tone or halftone dot. When the image has been judged to be a character or halftone dot, the combination with a reference wave is selected according to the edge detection judgment of the present invention explained before. On the other hand, when the image has been judged to be a halftone, the combination with a reference wave is selected so that the image can be written from the center of a pixel. In the case of the embodiment shown in FIG. 1, image modulation is conducted only by the modulation circuit 260A, and in the case of the embodiment shown in FIG. 9, image modulation is conducted only by the modulation circuit 2260A. It is preferable that a line memory is prepared for the aforementioned image judgment and edge detection, and that the image judgment and edge detection are conducted according to two dimensional information. In the manner described above, more preferable image reproduction can be conducted.

Figure 12:
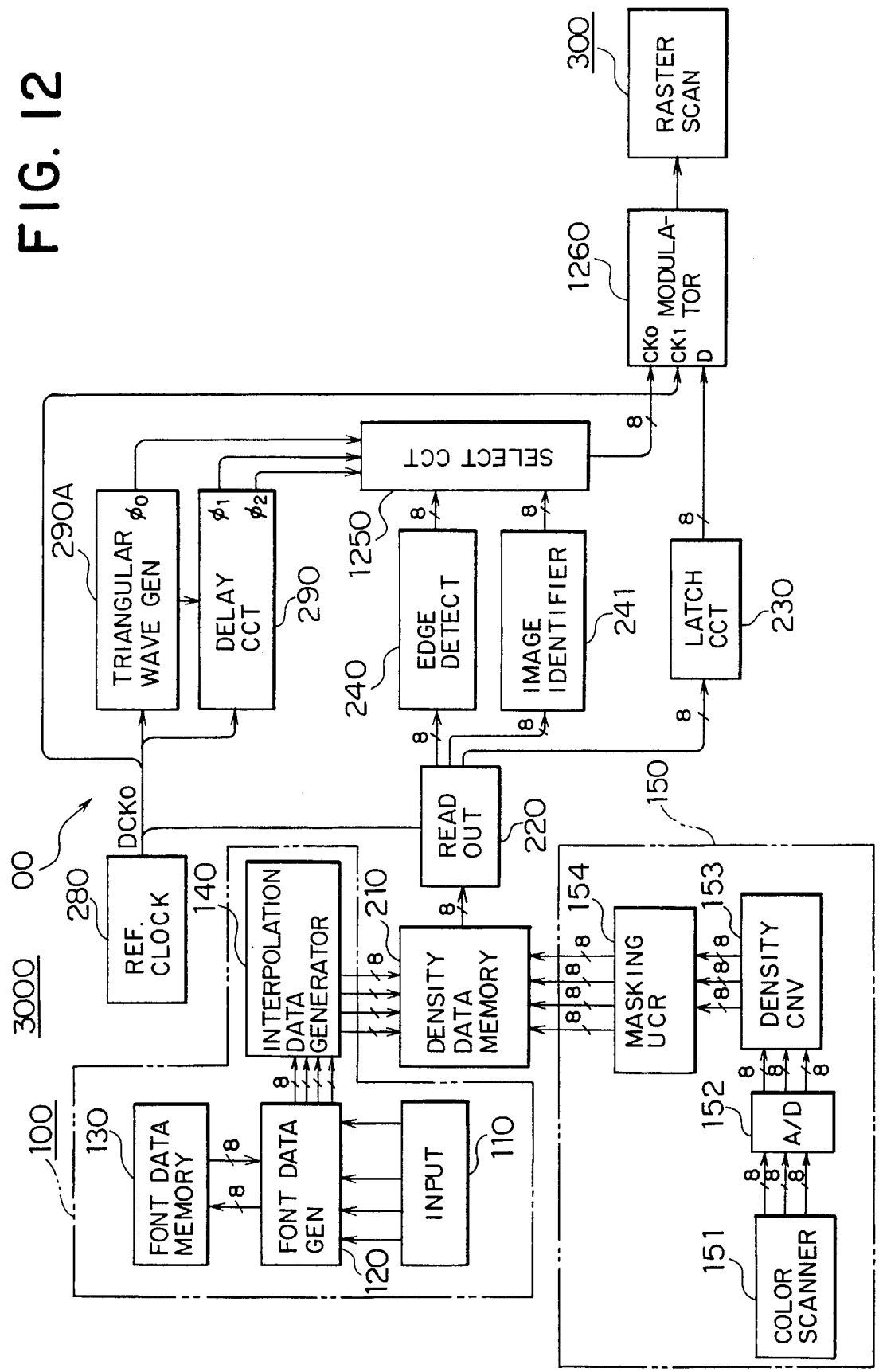
FIG. 12 is a block diagram of the third image processing circuit provided with an image judging circuit.

A portion of structure of the embodiment shown in FIG. 1 is changed so that the image processing circuit 3000 shown in FIG. 12 can be obtained. Signals are inputted into the selection circuit 1250, which selects the reference wave, from the image judging circuit 241 and the edge detection circuit 240. Then, the selection circuit 1250 judges whether the image is a character, halftone or halftone dot. After that, the selection circuit 1250 selects or synthesizes the reference wave corresponding to the result of the judgment, and outputs the synthesized wave to the the modulation circuit 1260. In the modulation circuit 1260, the image density data inputted from the latch circuit 230 and the aforementioned reference wave are compared, and the modulated continuous image density data is outputted.

Figure 13:
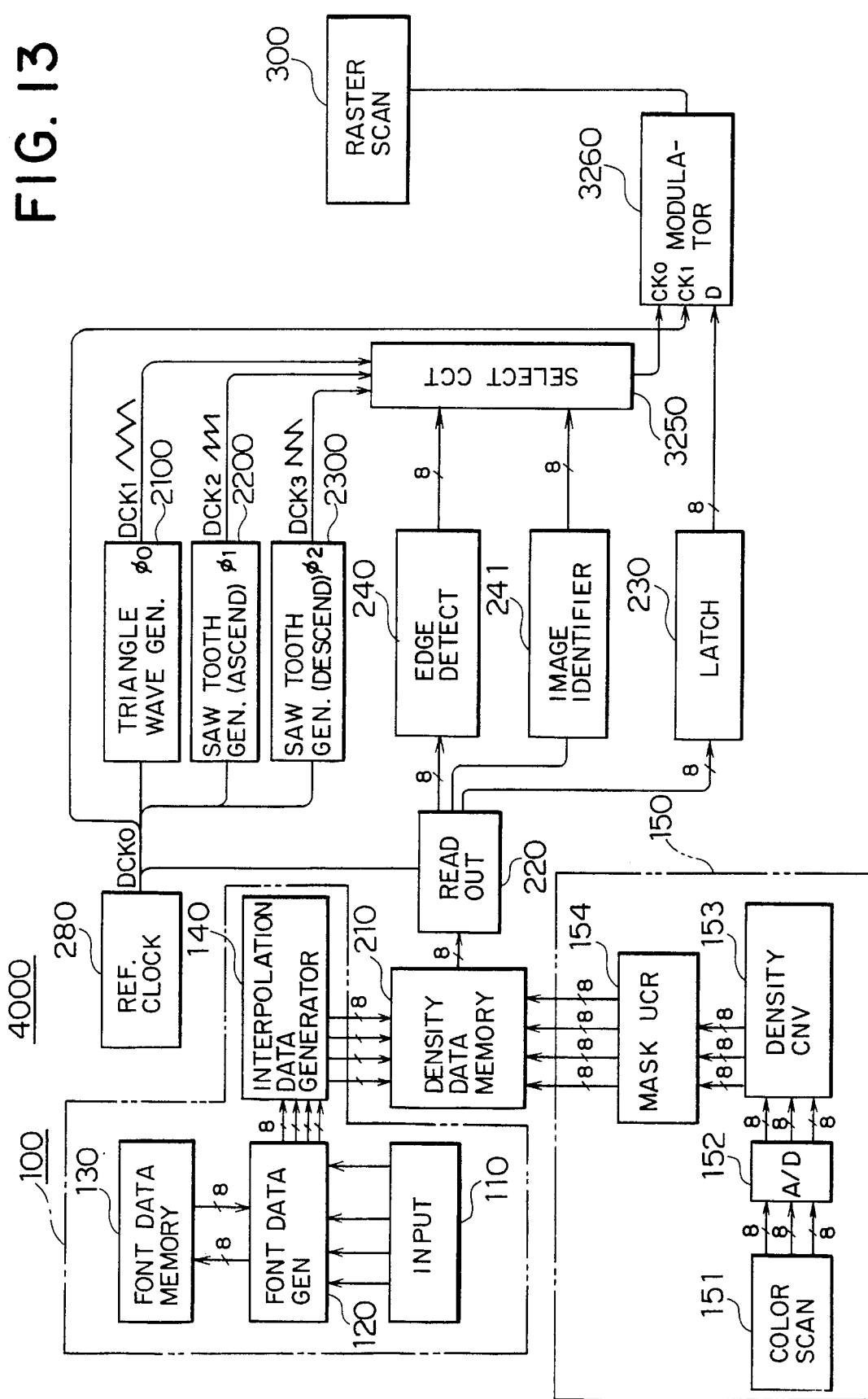
FIG. 13 is a block diagram of the fourth image processing circuit provided with an image judging circuit.

A portion of structure of the embodiment shown in FIG. 9 is changed to form the image processing circuit 4000 shown in FIG. 13. The selection circuit 3250 judges by the judgment circuit 241 and edge detection circuit 240 whether the image is a halftone image, a character, or a halftone dot. According to the result of judgment, the wave form which can be used for a reference wave is selected or synthesized and outputted to the modulation circuit 3260. In the modulation circuit 3260, the image density data inputted from the latch circuit 230 and the reference wave having the selected wave form are compared so that the modulated image density data can be outputted.

In this embodiment, pulse-width-modulation by a laser is utilized. It is possible that the difference between the reference wave and the image density data is outputted without binarizing. It is possible to form a sharp latent image by utilizing a high γ photoreceptor in this case, too.

Figure 19:
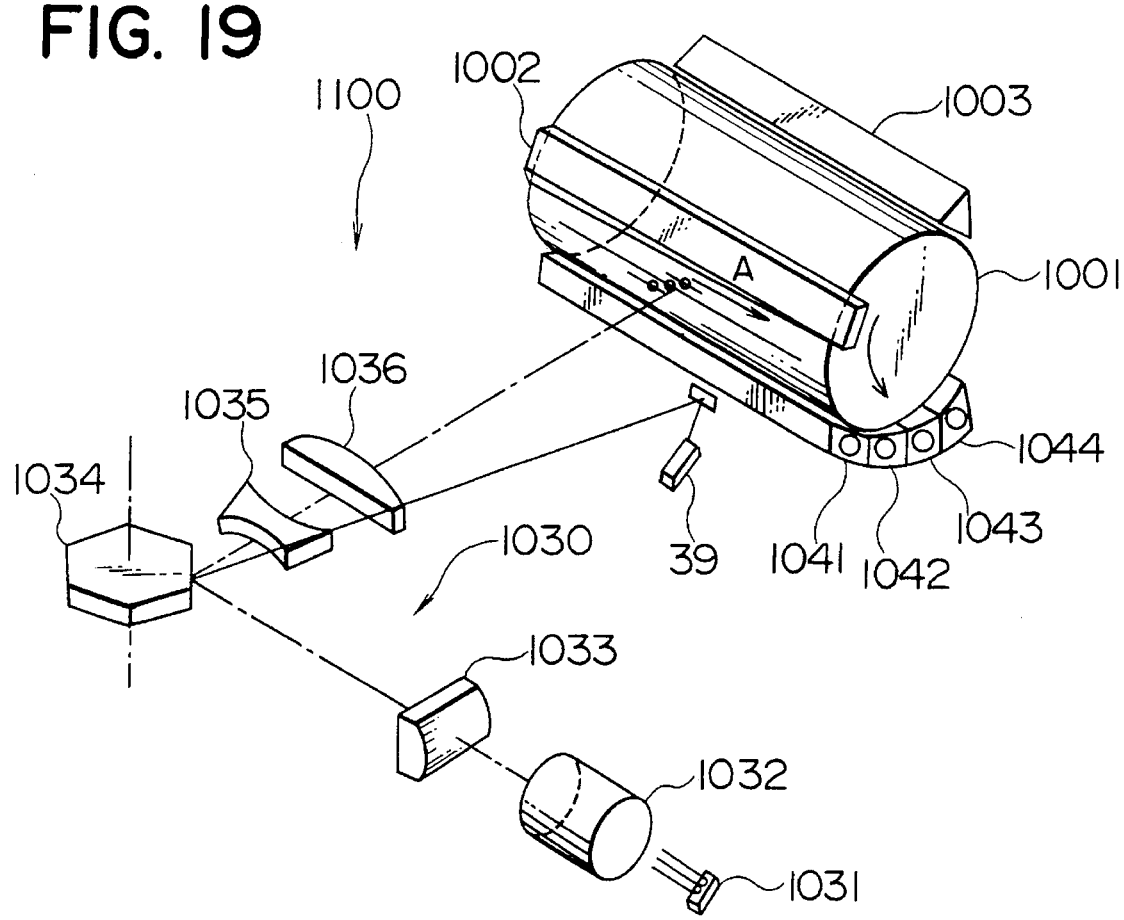
FIG. 19 is a schematic illustration of an image forming apparatus.

The structure of the image forming apparatus 100 of another embodiment of the present invention will be explained as follows. FIG. 19 is a perspective view showing the outline of structure of the image forming apparatus of this embodiment.

In the color image forming apparatus 1100, a color image is formed in such a manner that: the drum-shaped photoreceptor 1001, which is an image forming body, is uniformly charged; a dot-shaped electrostatic latent image is formed by a spot light which has been made by pulse-width-modulating or intensity-modulating the digital image density data sent from a computer or scanner; the electrostatic latent image is reversal-developed by toner so that a dot-shaped toner image can be formed; the aforementioned charging, exposing, and developing processes are repeated so that a color toner image can be formed on the photoreceptor; and then the color toner image is transferred on a recording paper, separated and fixed.

The image forming apparatus 1100 comprises a drum-shaped photoreceptor 1001 (which will be referred to as a photoreceptor, hereinafter), a scorotron charger 1002 which gives a uniform electric charge on the surface of the photoreceptor 1001, an optical scanning system 1030, developing units 1041–1044 which are loaded with yellow, magenta, cyan and black toners, and a cleaning unit 1003.

The structure of each section will be explained as follows.

The optical scanning system 1030 is operated in such a manner that: a semiconductor laser array 1031 is oscillated by a modulation signal which has been modulated by an image density data sent from a page memory (not shown in the drawing), the oscillated laser beam is deflected by a polygonal mirror 1034 which is rotated at a predetermined speed, and a minute spot of the deflected beam scans the uniformly charged photoreceptor 1001 surface through an fθ lens 1035 and cylindrical lenses 1033, 1036. The semiconductor laser array 1031 is provided for a coherent light source. A collimator lens 1032 is provided for an optical light emitting system. The polygonal mirror 1034 and fθ lens 1035 are provided for an optical deflection system. The cylindrical lenses 1033, 1036 are provided for an optical correction system to correct the tilt caused by the polygonal mirror 1034.

The optical scanning system 1030 is provided with an index detection circuit (not shown in the drawing). The index detection circuit detects the surface position of the polygonal mirror 1034 which is rotated at a predetermined speed, by the index signal sent from an index sensor 1039, and an optical scanning is conducted according to a modulated digital image density signal which will be de scribed later, by the raster scanning system, wherein the period of primary scanning is adopted for the aforementioned scanning.

The semiconductor laser array 1031 is composed in such a manner that: semiconductor lasers 1031a–1031c are disposed on a base at an interval of 0.1 mm, for example. GaAlAs is used for the semiconductor laser 1031. Its maximum output is 5 mW. The optical efficiency is 25%. The expansion angle is 8–16° in the direction parallel with the joint surface, and 20–36° in the direction perpendicular to the joint surface. Since color toner images are successively superimposed on the surface of the photoreceptor 1001, exposure is preferably conducted by light, the wavelength of which is long enough so that the light can not be absorbed by colored toners. In this case, the wavelength of beam is 800 nm.

Figure 16:
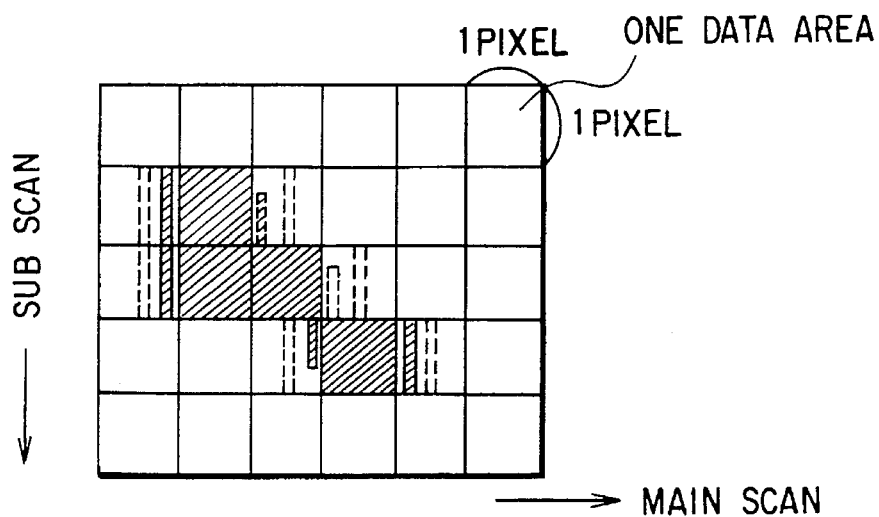
FIG. 16 is a schematic illustration of latent image formation according to the modulation signal sent from the image processing apparatus.

FIG. 16 shows a model in which a latent image is formed by a modulation signal sent from the the image processing apparatus of this embodiment.

In the image forming apparatus 1100 of this embodiment, gradation is expressed by changing the area of a dot. As described above, the image signal made by a computer or read in by a scanner is processed as follows: when the edge of high density overlaps a reading pixel, the signal of corresponding pixel becomes the same as the intermediate density in a uniform image. When the same reference wave is utilized under the condition that a selection circuit having the edge detecting function in all directions is not adopted, the recording at the edge is formed being isolated in the pixel center as illustrated by a dotted line in FIG. 16. In the image forming apparatus 1100, scanning is conducted 2-dimensionally, in other words, the primary and auxiliary scanning is conducted so that a dot-shaped latent image can be formed on the surface of the photoreceptor 1001. In the way described above, the resolution can be improved at the edge of the electrostatic latent image.

Figure 14:
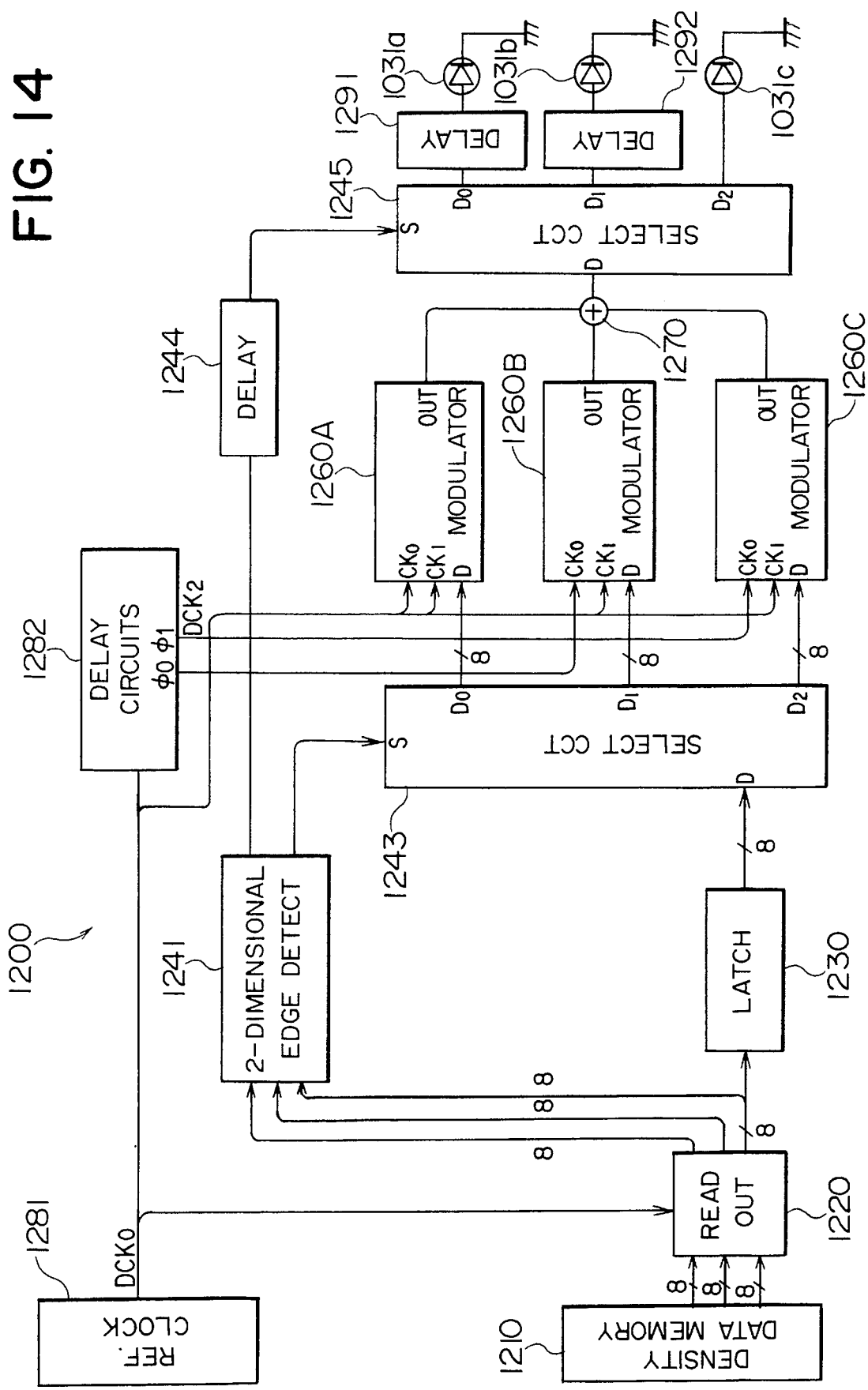
FIG. 14 and the following drawings show the fifth embodiment.
Figure 17:
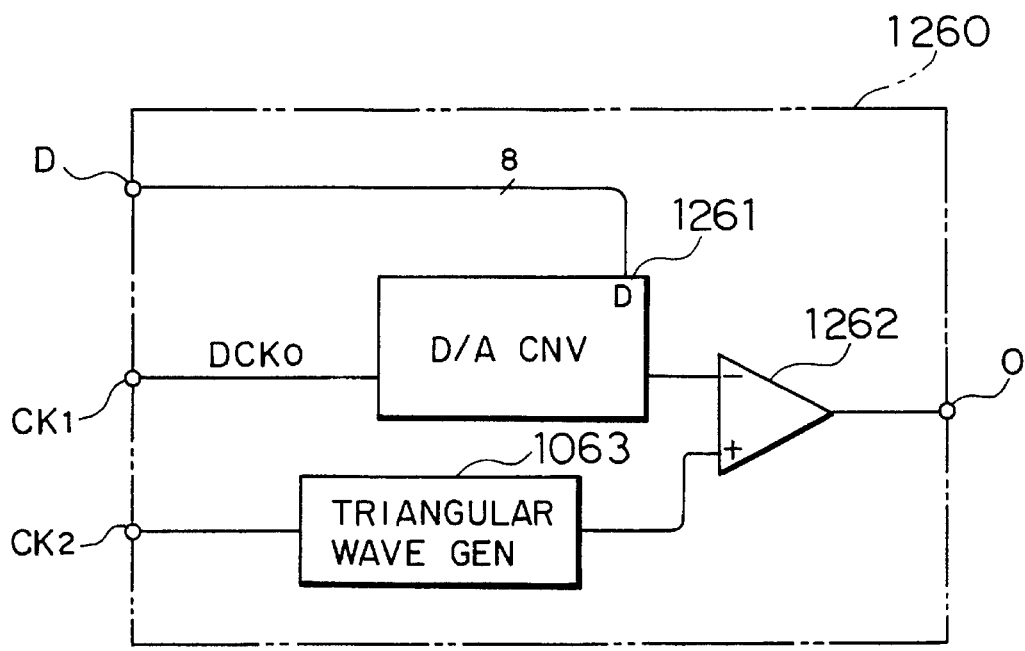
FIG. 17 is a block diagram of a modulation circuit.

FIG. 14 is a block diagram showing an example of the image processing circuit adopted in the image forming apparatus of this embodiment. FIG. 17 is a block diagram showing the modulation circuit of this embodiment.

An image processing circuit 1200 of this embodiment is a circuit which drives a semiconductor laser array 1031 by the modulation signal which has been made by pulse-modulating the image density data. For example, the image processing circuit 1200 detects the density gradient between the pixel density data corresponding to a plurality of pixels which face with all directions, and oscillates the center of the beam which forms an image on the surface of the photoreceptor 1 in the primary and auxiliary directions. The image processing circuit 1200 comprises a reading-out circuit 1220, latch circuit 1230, all direction edge detecting circuit 1241, selection circuits 1243, 1245, modulation circuits 1260A–1260C, synthesizing circuit 1270, reference clock generating circuit 1281, delay circuit 1282, and delay circuits 1291, 1292.

The reference clock generating circuit 1281 is a pulse signal generating circuit, and generates a pulse signal, the repetition signal of which is the same as the pixel clock. This clock is referred to as reference clock $DCK_0$.

The delay circuits 1282 are circuits which generate a plurality of pixel clocks $DCK_1$, $DCK_2$, the phase of which differs by $1/n$ period from that of reference clock $DCK_0$. In this case, the delay circuits 1282 generate pixel clock $DCK_1$, the phase of which is delayed by $1/3$ phase with regard to reference clock $DCK_0$, and pixel clock $DCK_2$, the phase of which is advanced by $1/3$ period with regard to reference clock $DCK_0$.

The image density data storing circuit 1210 is a common page memory(which is referred to as a page memory 1210, hereinafter). The image density data storing circuit 1210 is a RAM which stores image data by the unit of a page, and has a memory capacity by which at least a page of multi-value image density data can be stored. When the apparatus is applied to a color printer, the image density data storing circuit 1210 is provided with a memory capacity by which image density signal corresponding to a plurality of colors such as yellow, magenta, cyan and black can be stored.

The reading-out circuit 1220 reads out the image density data of adjoining 3 scanning lines synchronously with reference clock $DCK_0$ using an index signal for a trigger, and the read-out data is sent to the all direction edge detection circuit 1241, and at the same time, the image density data corresponding to the middle scanning line to be recorded is sent out to the latch circuit 1230.

The latch circuit 1230 is a circuit which latches the image density data for a period of time in which the processing is carried out by the all direction edge detection circuit 1241.

The all direction edge detection circuit 1241 finds difference between the image density data corresponding to a plurality of pixels of all directions, and reads out a selection signal corresponding to the results of difference and sends the selection signal to the selection circuit 1243, 1245. That is, all direction edge detection circuit 1241 detects the data corresponding to the edge from 3 lines of adjoining image density data and further detects the direction of the edge. In this case, the direction of edge is defined as the direction in which the change from the low density to high density exists. In the case of the image forming apparatus 1100 of this embodiment, recording of a latent image corresponding to the edge is conducted on the high image density side.

When the difference value is not less than α which is defined as a specific value, "+1" is outputted, and when the difference value is not more than −α, "−1" is outputted. When the image data of a portion except the edge, that is a differential value, is in the range of −α to +α, the difference value is "0". Assume that the difference values obtained in the manner described above are (−1, 0) in the primary scanning direction, (0, −1) in the auxiliary direction, (0, −1) in the left diagonal direction, and (0, 0) in the right diagonal direction, and then the moved position in the case of the combination of inputted data is read out from a reference table in the ROM. In this embodiment, the signal of (+1, −1) is outputted with regard to the combined inputted data. In the way described above, the recording position is moved in the primary scanning direction by +⅓, and in the case of the auxiliary scanning direction, a laser which scans the lower portion is selected. When the result of difference is (0, −1) in the primary scanning direction, (0, 0) in the auxiliary scanning direction, (0, 0) in the left diagonal direction, and (0, 0) in the right diagonal direction, then (−1, 0) is outputted. In this case, the recording position is moved in the primary scanning direction by −⅓.

The selection circuit 1243 corresponds to the first selection circuit, and outputs the image density data from different output terminals $D_0$–$D_2$ according to the selection signal specifically, when the selection signal is "0" the image density data is sent out from output terminal $D_0$, and the image density data of white background is sent out from output terminal $D_1$, $D_2$. When the selection signal is "−1", the image density data is sent out from output terminal D2, and the image density data corresponding to the white background is sent out from output terminals $D_0$, $D_1$. When the selection signal is "+1" the image density data is sent out from output terminal $D_1$, and the image density data corresponding to the white background is sent out from output terminals $D_0$, $D_2$.

As shown in FIG. 17, the modulation circuits 1260A–1260C have the same structure. The modulation circuits are composed of a D/A-conversion circuit 1261, comparator 1262, and triangular wave generating circuit 1263. The modulation circuits 1260A–1260C are operated in such a manner that: the image density data sent out from the selection circuit 1250A is D/A-converted by a D/A-converting circuit 1261 synchronously with reference clock $DCK_0$; a pixel clock, the period of which is the same as that of reference clock $DCK_0$, is made by a triangular wave generating circuit 1263; and these signals are compared so that a pulse-width-modulation signal can be obtained. All the modulation circuits 1260A–1260C D/A-convert the image density data by reference clock $DCK_0$, wherein only the phase of the clock inputted into the triangular wave generating circuit 1263 is different. In this case, the phase of the triangular wave reference clock of the triangular wave generating circuits 1263A–1263C is shifted by ⅓ period with regard to the phase of the reference clock. By selecting these modulation circuits 1260A–1260C, edge processing can be conducted on the portion corresponding to the edge in the primary scanning direction using the image density data which is continuous in the form of a scanning line. The detail will be described later.

The synthesizing circuit 270 is a circuit which synthesizes the modulation signal sent from the aforementioned modulation circuits 1260A–1260 C.

The selection circuit 1245 and the delay circuits 1291, 1292 correspond to an LD drive circuit which drives a semiconductor laser array 1031. When the LD drive circuit oscillates a semiconductor laser selected according to the selection signal, by the modulation signal sent from the synthesizing circuit 1270, the beam sent from the optical scanning system 1030 is shifted in the auxiliary scanning direction so that image formation is conducted.

The selection circuit 1245 corresponds to the second selection circuit, and turns on one of the semiconductor lasers 1031a–1031c according to the selection signal sent from all direction edge detecting circuit 1241. Edge processing is carried out in the auxiliary direction by the aforementioned operation. The detail will be described later.

The delay circuits 1291, 1292 prevent the tilt of the base plate of the semiconductor laser array 1031 and the delay of the start of scanning due to the optical scanning system.

In the above explanation, the image processing circuit 1200 is applied to a laser printer. However, the image processing circuit of the invention is not limited to the laser printer. When the image processing circuit is made into such a circuit that the image density data from a scanner is inputted and processed, the image processing circuit can be applied to a copying apparatus or other image forming apparatuses.

Figure 18:
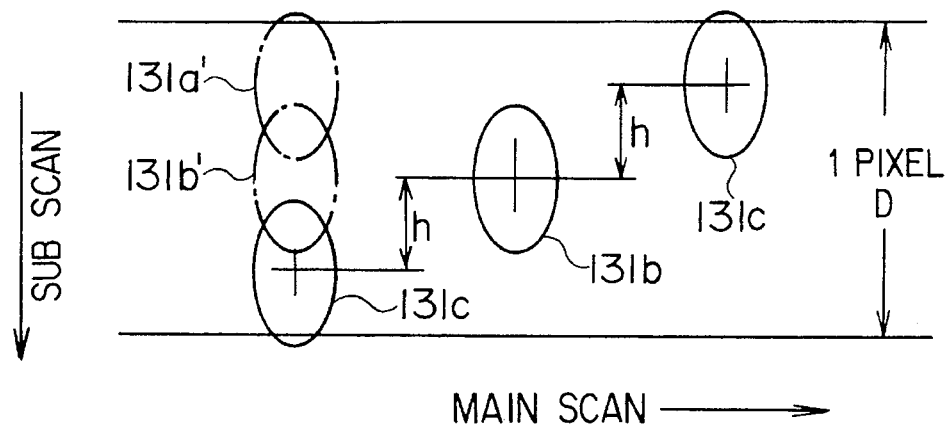
FIG. 18 is a view showing laser spots formed by a laser array on a photoreceptor.

A laser spot formed on the photoreceptor 1 by the semiconductor laser array 1031 is shown in FIG. 18.

The laser beam spots shown in FIG. 18 are formed the semiconductor laser array 131 which is composed in such a manner that 3 light emitting elements are provided at a constant interval. The semiconductor laser array 131 is disposed being inclined with regard to the primary scanning direction so that laser spots 131a, 131b, 131c are formed on the photoreceptor 1. Distance h between the centers of formed images is determined by the inclination angle of the semiconductor laser array 131. The laser beam spots 131a, 131b, 131c, which are illustrated by a solid line in the drawing, are formed on the surface of the photoreceptor 1001 under the condition that the delay circuits 1291, 1292 are operated. When the delay circuits 1291, 1292 are operated, the laser beam spot 131a is delayed to a laser beam spot 131a' which is illustrated by a one-dotted-chain-line in the drawing, and the laser beam spot 131b is delayed to a laser beam spot 131b' which is illustrated by a one-dotted-chain-line. The phases of the image formation centers of the laser beam spots 131a', 131b', 131c' become the same.

In the embodiment shown in FIG. 18, a pixel of scanning is conducted in such a manner that: the number of scanning lines in one pixel in the primary direction is 3; and one pixel of scanning is conducted by one operation of scanning by a semiconductor laser array composed of 3 light emitting elements. When the number m of light emitting elements in the semiconductor laser array is made equal to the number of scanning in one pixel in the primary scanning direction, one pixel of scanning is conducted by one operation of scanning, so that unevenness of scanning caused among the pixels can be reduced.

When distance h between the centers of image formation by the laser beam spots emitted from m pieces of light emitting elements, and one pixel of scanning width D are determined in such a manner that the following inequality can be satisfied $$h \leq (D/m)$$

more preferably h<(D/m), and then the scanning interval between the adjoining pixels becomes not less than (D/m). Accordingly, the overlaps among the pixels can be reduced and unevenness of scanning can be eliminated, so that an image of high quality can be obtained. In general, it is preferable that the inequality of D/(m+2)<h <(D/m) is satisfied, wherein m is an integer larger than 2. In the embodiment shown in FIG. 11-b (in this case, m=3), the laser array 1131 was tilted so that the inequality of (D/5)<h <(D/3) could be satisfied and the light emitting elements were disposed at a constant interval, and then an image of high quality without unevenness of scanning could be obtained.

FIG. 16 shows a model of latent image formation by the modulation signal sent from the image processing apparatus of the embodiment of the present invention.

In the image forming apparatus 1100 of this embodiment, gradation is expressed by changing the area of a dot. In the image forming apparatus 1100, both primary scanning and auxiliary scanning are conducted so that a dot-shaped latent image can be formed on the photoreceptor 1001. This scanning is carried out by an image processing circuit. When an image signal made by a computer or read in by a scanner is processed and the edge of high image density overlaps a read-out pixel, the signal in a corresponding pixel becomes the same as the intermediate density in a uniform image.

When the same reference wave is used without adopting the selection circuit capable of detecting all direction edges, the recording of the edge is isolated in the center portion as illustrated by a dotted line in FIG. 16. When the image processing circuit 1200 is utilized, the spot of recording is shifted to the edges of all directions including the primary and auxiliary directions. When an electrostatic image is formed in the manner described above, the resolution of the edge can be improved.

Next, the operation of the image processing circuit 1200 will be explained as follows.

Figure 15:
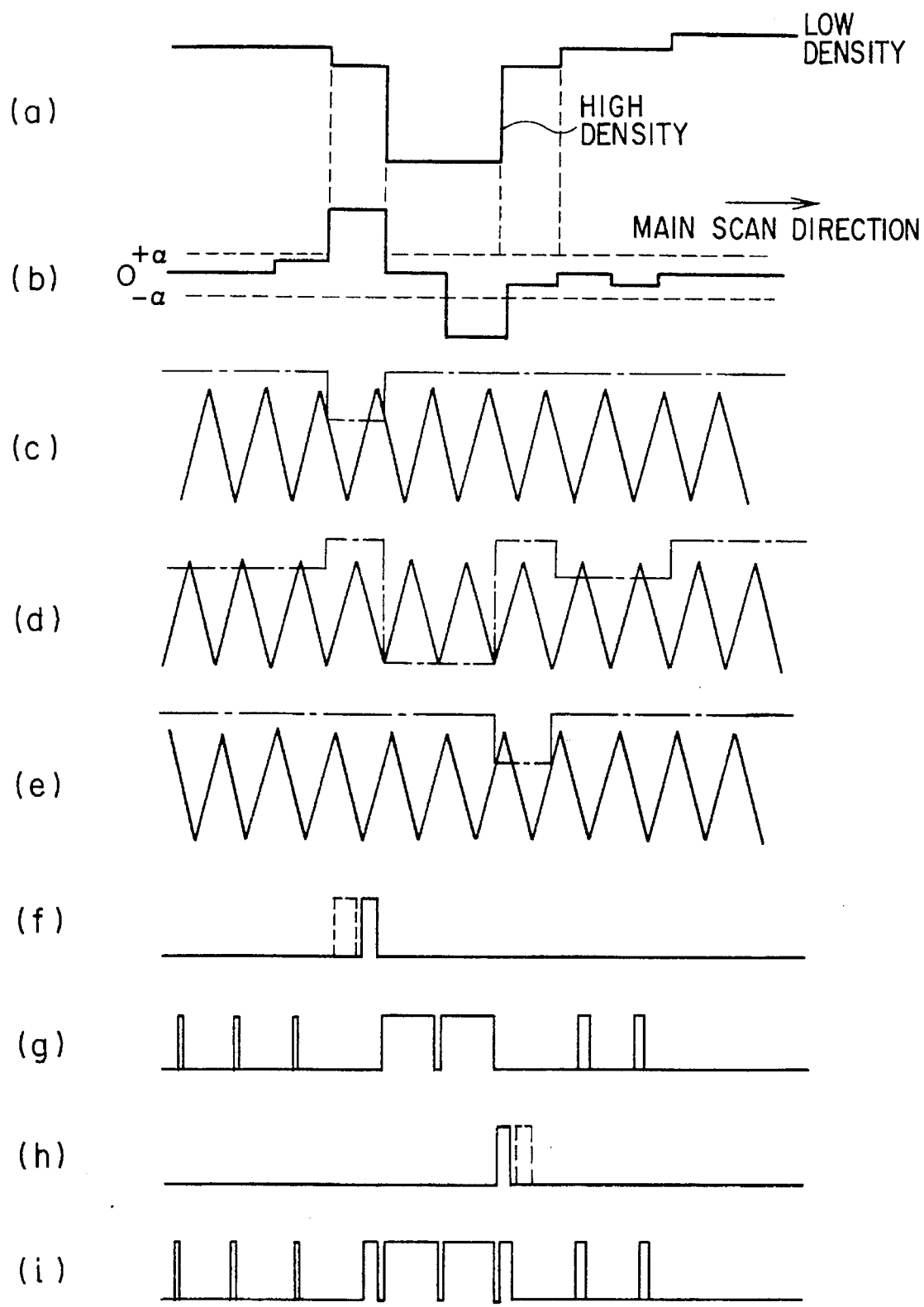
FIG. 15(a) to FIG. 15(i) are time charts of signals of the image processing circuit.

FIG. 15 show time charts showing the signal of each section of the image processing circuit of this embodiment.

In the drawing, (a) shows a portion of a scanning line of image density data which is read out according to reference clock $DCK_0$ using the index signal sent from the page memory for a trigger. A scanning line of image density data described above is sent out from the reading-out circuit 1220 simultaneously to all direction edge detection circuit 1241 and latch detection circuit 1230. The higher the level of signal is, the lower the density is, and the lower the level of signal is, the higher the density is.

In FIG. 15, (b) shows the output from the primary scanning edge detection circuit 1240 which outputs the change of the level of continuous image density data, in other words, the differential value of the level of continuous image density data. In this way, the tilt of the image density in one scanning line can be detected. In the case where the differential value is not less than absolute value α, it can be judged that there is a tilt. Further, the direction of the edge of the image density is detected. That is, when the outputted value is positive, it shows that the edge is located on the left of the primary scanning direction, and the outputted value is negative, it shows that the edge is located on the right of the primary scanning direction. Edge detection of other directions is conducted in the same manner as described above, and the position to where the recording position is moved in the primary and auxiliary directions can be determined according to a ROM table. In the case where the outputted value is "0", it shows that the image density data of the same level is connected with the edge. This output signal is sent to the selection circuit 1243 according to the reference clock $DCK_0$.

On the other hand, the latch circuit 1230 latches the signal for a period of time corresponding to the processing speed of all direction edge detection circuit 1241 and sends out the signal to the selection circuit 1243. The selection circuit 1243 sends out the density data from different output terminal according to the selection signal of the edge detection circuit 1241.

In FIG. 15, (c)–(d) show the combination of the reference data to be selected and the image data. For example, the edge exists only in the primary direction shown in (b). In the case where the edge is detected in a diagonal direction, a reference wave and laser combined according to the ROM table as described above are selected.

In FIG. 15, (c) shows a modulating operation in the modulation circuit 1260A. Only when the output of the detection circuit 1241 is positive, the image density data is inputted into the modulation circuit 1260A, and when the output of all direction edge detection circuit 1241 is not positive, the image density data of white background is inputted. The triangular wave outputted at this time is made from clock $DCK_2$, the phase of which is advanced by ⅓ period with regard to reference clock $DCK_0$, and the repetition period of which is the same. In the manner described above, as shown in FIG. 15(f), the output signal of the modulation circuit 260A is a modulation signal, the phase of which is advanced by ⅓ period compared with the modulation signal which has been pulse-width-modulated by the triangular wave according to reference clock $DCK_0$.

In FIG. 15, (d) shows a modulating operation in the modulation circuit 260B. The image density data in the period when the selection signal from all direction edge detection circuit 1241 is "0", is the image density data of white background in the case where the output is not "0", and the modulation signal shown in (g) is outputted.

In FIG. 15, (e) shows a modulating operation in the modulation circuit 1260C. For the period in which the output of all direction edge detection circuit 1241 is negative, processing is conducted on the image density data which is previous by one pixel. That is, when the output of all direction edge detection circuit 1241 is "–1", the image density data is inputted, and when the output is not "–1", the image density data of white background is inputted. In this case, the phase of the triangular wave is delayed by ⅓ period with regard to reference clock $DCK_0$. In the manner described above, as illustrated in FIG. 15(h), the phase of the modulation signal outputted from the modulation circuit 1260C is delayed by ⅓ period as compared with the modulation signal which has been pulse-width-modulated by the triangular wave according to reference clock $DCK_0$.

In FIG. 15, (i) shows a modulation signal outputted from the synthesizing circuit 1270. When the edge and the direction of the edge are detected by all direction edge detection circuit 1241, the image processing circuit 1200 of this embodiment outputs a scanning line of modulation signal which has been shifted by the amount of slippage in the primary scanning direction, into the data terminal of the selection circuit 1245.

Next, the selection signal sent from all direction edge detection circuit 1241 is delayed by the delay circuit 1244 by the processing time in the modulation circuit and synthesizing circuit so that the delayed signal is sent out to the selection circuit 1245. The selection circuit 1245 sends out the density data to a specific laser according to the selection signal from all direction edge detection circuit 1241 so that the laser can emit light. The modulation signal sent from output terminals $D_0$, $D_1$ of the selection circuit 1245 is delayed by the delay circuits 1291, 1292 so that the slippage of starting point in the primary scanning direction can be corrected, and the signal oscillates the semiconductor lasers 1031a, 1031b. The semiconductor lasers 1031a–1031c, which are the light emitting points of the semiconductor laser array 1031, are set so that the image formation can be conducted by the optical scanning system 1030 being shifted by ⅓ pixel in the auxiliary scanning direction. Accordingly, the auxiliary scanning component is shifted in the direction of the edge.

As explained above, the image forming apparatus 1100 of this embodiment forms an image in such a manner that the edge of an electrostatic latent image is corrected, so that the resolution of the edge can be improved.

The image forming process conducted in the image forming apparatus 1100 will be explained as follows.

First, the photoreceptor 1001 is uniformly charged by the scorotron charger 1002. An electrostatic latent image corresponding to yellow is formed on the drum-shaped photoreceptor 1001 by the laser beam which has been optically modulated by yellow data (8 bits of digital density data) stored in the frame memory 1210. The aforementioned electrostatic latent image corresponding to yellow is developed by the first developing unit 1041, and the first dot-shaped toner image (a yellow toner image), which is very sharp, is formed on the photoreceptor 1001. While the first toner image formed in the manner described above is not transferred onto recording paper P, the photoreceptor 1001 is charged by the scorotron charger 1002 again.

Next, the laser beam is optically modulated by magenta data (8 bits of digital density data), and the photoreceptor 1001 is exposed with the modulated laser beam so that an electrostatic latent image is formed. This electrostatic latent image is developed by the second developing unit 1042 so that the second toner image (a magenta toner image) is formed. In the same way, the third toner image (a cyan toner image) is sequentially developed by the third developing unit 1043, and a three color toner image is formed on the photoreceptor 401. Finally, the fourth toner image (a black toner image) is formed, and a four color toner image is formed on the photoreceptor 1001.

According to the image forming apparatus 1100 of this embodiment, the photoreceptor has an excellent high γ characteristic. According to the aforementioned excellent high γ characteristic, even when a plurality of toner images are formed on the photoreceptor by conducting a plurality of charging and developing processes, a latent image can be stably formed. That is, even when a toner image is illuminated with a beam according to a digital signal, a very sharp dot-shaped electrostatic latent image without a fringe is formed. As a result, a very sharp toner image can be obtained.

After the photoreceptor 1001 has been charged by the charger (this process may be omitted), this 4 color toner image is transferred by the action of the transfer unit 1462 onto recording paper P supplied by a paper feeding unit.

Recording paper P on which the toner image has been transferred, is separated from the photoreceptor 1001 by the separation electrode 1463. Then, recording paper P is conveyed by a guide and conveyance belt to the fixing unit so that the transferred image is fixed. After that, recording paper P is discharged onto a discharge tray.

In this embodiment, 3 reference waves, the phases of which are respectively shifted by ⅓ period (0, ±⅓), are utilized. Reference waves of other phases may be used. For example, the phases of (0, ±¼) or phases of (0, ±⅙) may be used. It is preferable that not less than 3 reference waves are selectively utilized according to the situation such as the image density or edge detection output. For example, the reference wave, the phase of which differs by (0, ±⅙, ±²⁄₆) may be used. In the manner described above, a reference wave, the phase of which is different, is selected in accordance with the image density data. Therefore, a sharp image harmonizing with the adjacent image density can be obtained.

What is claimed is:

1. An apparatus for forming an image as a two dimensional array of dot images arranged in horizontal and vertical directions, the image forming apparatus comprising:

means for sequentially inputting image density data of pixels into the apparatus, each image density data representing an image density level in a pixel of the image;

edge detecting means for detecting an edge point in the image by obtaining a value of an image density change from a pixel to a succeeding pixel in the horizontal direction by comparing corresponding image density level from the image density data, and by classifying each pixel, based on the image density change value, into one of a predetermined number of classes, the predetermined number of classes including at least an edge-starting pixel where the value of the image density change is larger than a predetermined positive threshold value, an edge-ending pixel where the value of the image density change is smaller than a predetermined negative threshold value and a non-edge pixel where the value of the image density change lies between the predetermined positive threshold value and the predetermined negative threshold value;

modulated light beam generating means for generating a modulated light beam pulse based on both the image density level and the class of each pixel, wherein a duration width of the modulated light beam pulse corresponds to the image density level of the pixel, and a timing shift of the modulated light beam pulse generation corresponds to the class of the pixel so that the modulated light beam pulse lags in phase for the edge-starting pixel and leads in phase for the edge-ending pixel;

a photoreceptor member; and scanning means for forming an electrostatic latent image as the array of dot images on a surfaces of the photoreceptor by scanning the surface with the modulated light beam pulses, wherein a dot image at an edge shifts in the horizontal direction by lead and lag of phase of the modulated light beam pulse.

2. An apparatus for forming an image as to a two dimensional array of dot images arranged in horizontal and vertical directions, the image forming apparatus comprising:

means for sequentially inputting image density data of pixels into the apparatus, each image density data representing an image density level in a pixel of the image;

edge detecting means for detecting an edge point in the image by obtaining a value of an image density change from a pixel to a succeeding pixel in the horizontal direction by comparing corresponding image density levels from the image density data, and by classifying each pixel, based on the image density change, into one of a predetermined number of classes, the predetermined number of classes including at least an edge-starting pixel where the value of the image density change is larger than a predetermined positive threshold value, an edge-ending pixel where the value of the image density change is smaller than a predetermined negative threshold value and a non-edge pixel where the value of the image density change lies between the positive and the negative predetermine threshold values;

reference wave generating means for generating a plurality of reference waves equal in number to the predetermined number of the classes, the reference waves each being of like frequency and different from each other in at least one of phase and wave forms;

reference wave selecting means for selecting a reference wave for each pixel from the plurality of reference waves according to the at least one of phase and wave forms corresponding to the pixel class;

density signal modulating means for generating a modulated image density signal for each pixel by a modulation of the image density signal with the selected reference wave;

a photoreceptor member having a surface which advances in the vertical direction of the array of dot images;

laser beam oscillating means responsive to the modulated image density signal for emitting a laser beam modulated by the modulated image density signal; and deflecting means for deflecting the laser beam in the horizontal direction so as to scan the surface of the photoreceptor member with the modulated laser beam.

3. An apparatus for forming an image on a photoreceptor as a two dimensional array of dot images arranged in horizontal and vertical directions, the image forming apparatus comprising:

means for sequentially inputting image density data of pixels into the apparatus, each image density data representing an image density level in a pixel of the image;

edge detecting means for detecting an edge point in the image by obtaining a value of an image density change from a pixel to a succeeding pixel by comparing corresponding image density levels from the image density data, and by classifying each pixel, based on the image density change value, into one of a predetermined number of classes, the predetermined number of classes including at least an edge-starting pixel where the value of the image density change is larger than a predetermined positive threshold value, an edge-ending pixel where the value of the image density change is smaller than a predetermined negative threshold value and a non-edge pixel where the value of the image density change lies between the predetermined positive threshold value and the predetermined negative threshold value;

scanning means for scanning the photoreceptor with a spot light to form a dot image on the photoreceptor; and modulating means for modulating the exposing light based on the image density data of pixels to change size of the dot image so that density levels of the image are reproduced, the modulating means including means for shifting the position of the dot image in accordance with the edge-starting pixel and the edge-ending pixel to a direction so that the dot image is shifted toward a neighboring dot of the dot image.

4. The apparatus of claim 3, wherein the spot light is a laser beam.

5. The apparatus of claim 3, wherein the inputting means inputs the density data of pixels in a line of pixels corresponding to the horizontal direction of the two dimensional array of dot images, the vertical direction of the two dimensional array being a plurality of the line images.

6. The apparatus of claim 5, wherein the inputting means inputs the density data of at least three lines of pixels simultaneously.

7. The apparatus of claim 3, wherein the modulating means further includes reference wave generating means for generating plural types of reference waves differing in at least one of phase and wave forms, and selecting means for selecting one of the plural types of reference waves, and wherein the shifting means shifts the position of dot image by using the selected reference wave.

8. The apparatus of claim 3, wherein the scanning means has a scanning line corresponding to a line of dot images in the horizontal direction and comprises plural laser beam generators to divide the scanning line into plural sub-scanning lines differing in position in the vertical direction from each other, and wherein the modulating means includes means for selecting one of the plural sub-scanning lines so as to shift the position of the dot image in the vertical direction.

9. The apparatus of claim 3, wherein the edge detecting means has a predetermined positive threshold value and a predetermined negative threshold value, and judges an edge point and determines the direction of an edge by comparing values of image density change with the threshold values.

10. The apparatus of claim 9, wherein the edge detecting means determines a pixel as an edge-starting pixel when the value of an image density change is larger than the positive threshold value, as an edge-ending pixel when the value of an image density change is smaller than the negative threshold value, and as a non-edge pixel when the value of an image density change lies between the positive threshold value and the negative threshold value.

\* \* \* \* \*